United States Patent
Lee et al.

(10) Patent No.: US 11,039,286 B2
(45) Date of Patent: Jun. 15, 2021

(54) V2V INTERACTION/V2IOT COMMUNICATION METHOD AND DEVICE

(71) Applicants: Samsung Electronics Co., Ltd., Suwon-si (KR); RESEARCH & BUSINESS FOUNDATION SUNGKYUNKWAN UNIVERSITY, Suwon-si (KR)

(72) Inventors: Ho-Yeon Lee, Seongnam-si (KR); Min Young Chung, Seoul (KR); Sung-Hoon Kim, Seoul (KR); Jun Suk Kim, Suwon-si (KR); Young-Kyo Baek, Seoul (KR); Jung-Je Son, Yongin-si (KR); Seung-Ri Jin, Suwon-si (KR); Tae-Jin Lee, Suwon-si (KR); Yunmin Kim, Suwon-si (KR); Ji Hyoung Ahn, Suwon-si (KR)

(73) Assignees: Samsung Electronics Co., Ltd., Suwon-si (KR); RESEARCH & BUSINESS FOUNDATION SUNGKYUNKWAN UNIVERSITY, Suwon-si (KR)

(*) Notice: Subject to any disclaimer, the term of this patent is extended or adjusted under 35 U.S.C. 154(b) by 0 days.

(21) Appl. No.: 16/639,009

(22) PCT Filed: Sep. 10, 2018

(86) PCT No.: PCT/KR2018/010547
§ 371 (c)(1),
(2) Date: Feb. 13, 2020

(87) PCT Pub. No.: WO2019/050358
PCT Pub. Date: Mar. 14, 2019

(65) Prior Publication Data
US 2020/0367035 A1    Nov. 19, 2020

(30) Foreign Application Priority Data
Sep. 8, 2017 (KR) .................. 10-2017-0115085

(51) Int. Cl.
*H04W 4/40* (2018.01)
*H04W 76/14* (2018.01)
*H04W 72/04* (2009.01)

(52) U.S. Cl.
CPC ............ *H04W 4/40* (2018.02); *H04W 72/04* (2013.01); *H04W 76/14* (2018.02)

(58) Field of Classification Search
CPC .......... H04W 4/40; H04W 4/50; H04W 4/70; H04W 4/80; H04W 72/04; H04W 74/08;
(Continued)

(56) References Cited

U.S. PATENT DOCUMENTS

2012/0077507 A1    3/2012  Lee
2012/0177067 A1    7/2012  Cho et al.
(Continued)

FOREIGN PATENT DOCUMENTS

KR   10-2012-0080410 A   7/2012
KR   10-2018-0106204 A   10/2018
(Continued)

OTHER PUBLICATIONS

Panasonic et al., WF on Resource Pool Configuration in D2D, R1-144364, TSG-RAN WG1 Meeting #78bis, Ljubljana, Slovenia, Oct. 6-10, 2014.
(Continued)

Primary Examiner — Jean A Gelin
(74) Attorney, Agent, or Firm — Jefferson IP Law, LLP

(57) ABSTRACT

Disclosed is a method by which a first terminal supports vehicle-to-everything (V2X) communication through a first data transmission, comprising the steps of: determining a
(Continued)

wireless resource for a second data transmission of a second terminal; transmitting, to the second terminal, first data including information of the wireless resource; and receiving, by using the wireless resource, second data transmitted from the second terminal.

18 Claims, 23 Drawing Sheets

(58) Field of Classification Search
CPC ........... H04W 74/0833; H04W 74/085; H04W 72/02; H04W 72/042; H04W 72/046; H04W 76/14; H04W 76/28; H04W 84/18; H04W 88/182; H04W 92/18; Y02D 30/70; Y02D 70/142; Y02D 70/144; Y02D 70/162; Y02D 70/21; Y02D 70/22
See application file for complete search history.

(56) References Cited

U.S. PATENT DOCUMENTS

| | | | | |
|---|---|---|---|---|
| 2013/0150108 | A1* | 6/2013 | Yang | H04W 76/14 |
| | | | | 455/509 |
| 2016/0044668 | A1* | 2/2016 | Yoon | H04W 72/1289 |
| | | | | 370/280 |
| 2016/0338095 | A1* | 11/2016 | Faurie | H04W 28/0278 |
| 2016/0381666 | A1* | 12/2016 | Kim | H04W 72/0446 |
| | | | | 370/329 |
| 2017/0054540 | A1* | 2/2017 | Kim | H04W 4/70 |
| 2017/0188375 | A1 | 6/2017 | Seo et al. | |
| 2017/0188391 | A1* | 6/2017 | Rajagopal | H04W 74/0816 |
| 2017/0201461 | A1 | 7/2017 | Cheng et al. | |
| 2017/0215119 | A1 | 7/2017 | Hong et al. | |
| 2017/0230939 | A1* | 8/2017 | Rudolf | H04W 4/70 |
| 2018/0184460 | A1* | 6/2018 | Hou | H04W 74/0833 |
| 2018/0270624 | A1 | 9/2018 | Lee et al. | |
| 2019/0132854 | A1* | 5/2019 | Nakamura | H04W 74/0808 |
| 2019/0194478 | A1* | 6/2019 | Fukagawa | C09D 151/003 |
| 2020/0195389 | A1* | 6/2020 | Basu Mallick | H04L 1/08 |
| 2020/0267702 | A1* | 8/2020 | Kim | H04W 52/386 |

FOREIGN PATENT DOCUMENTS

| | | |
|---|---|---|
| WO | 2015/020356 A1 | 2/2015 |
| WO | 2015/194916 A1 | 12/2015 |

OTHER PUBLICATIONS

Digital Single Market, Automated Driving Progressed by Internet of Things, Jun. 11, 2019.
3GPP, The Mobile Broadband Standard, Standardization of NB-IOT completed, Jun. 22, 2016.
3GPP, The Mobile Broadband Standard, Initial Cellular V2X standard completed, Sep. 26, 2016.
John B. Kenney, Dedicated Short Range Communication (DSRC) Standards in the United States, IEEE and SAE Standards for Wireless Access in Vehicular, Environments (WAVE), Aug. 1, 2011.
3GPP TR 22.885, V14.0.0, 3rd Generation Partnership Project, Technical Specification Group Services and System Aspects, Study on LTE Support for Vehicle to Everything (V2X) Services (Release 14), Dec. 1, 2015.
Particle, The Asset Tracker—Cellular GPS Module, 2020.
NB-IOT, Enabling New Business Opportunities, Huawei, Jan. 1, 2015.
Vodafone et al., 3GPP TSG RAN Meeting #72, RP-161324, New work item proposal: Enhancements of NB-IoT, Huawei, HiSilicon, Ericsson, Qualcomm, Busan, Korea, Jun. 13-16, 2016.
U-Blox, World's first cellular NB-IoT module combines easy, affordable, global connectivity with over 10 years' battery life for low data rate IoT applications, Jun. 6, 2016.
Qualcomm, Leading the world to 5G, Cellular Vehicle-to-Everything(C-V2X) technologies, Qualcomm whitepaper, Jun. 1, 2016.
ZTE, LTE Network Design and Deployment Strategies, Jan. 17, 2011.
3GPP TR 25.912, V13.0.0, 3rd Generation Partnership Project, Feasibility study for evolved Universal Terrestrial Radio Access (UTRA) and Universal Terrestrial Radio Access Network (UTRAN) (Release 13), Dec. 1, 2015.
3GPP TS 36.321, V14.1.0, 3rd Generation Partnership Project, Evolved Universal Terrestrial Radio Access (E-UTRA); Medium Access, Control (MAC) protocol specification, Dec. 1, 2016.
DB Pia, Sensing based semi-persistent resource allocation for LTE V2V communication, Jun. 30, 2016.

* cited by examiner

V2V INTERACTION/V2IOT COMMUNICATION METHOD AND DEVICE

CROSS-REFERENCE TO RELATED APPLICATION(S)

This application is a National Phase Entry of PCT international Application No. PCT/KR2018/010547, which was filed on Sep. 10, 2018, and claims priority to Korean Patent Application No. 10-2017-0115085 filed on Sep. 8, 2017 in the Korean Intellectual Property Office, the contents of which are incorporated herein by reference.

BACKGROUND

1. Field

The disclosure generally relates to a V2V interaction/V2IOT communication method and device, and more particularly, to a method and a device for enhancing direct communication between vehicles or direct communication between a vehicle and an IoT terminal.

2. Description of the Related Art

Efforts have been made to develop an improved 5G ($5^{th}$-Generation) or pre-5G communication system to meet the increasing demand for wireless data traffic after commercialization of 4G ($4^{th}$-Generation) communication systems. For this reason, a 5G communication system or a pre-5G communication system is called a system of a beyond 4G network or a post LTE system.

In order to achieve high data rates, 5G communication systems are being considered for implementation in the ultra-high frequency (mm Wave) band (e.g., such as the 60 GHz band). In order to mitigate the path loss of radio waves and increase the propagation distance of radio waves in the ultra-high frequency band, beamforming, massive array multiple input multiple output (massive MIMO), full dimensional MIMO (FD-MIMO), array antenna, analog beamforming, and large scale antenna techniques are being discussed.

In addition, in order to improve the network of a system, technologies such as small cells, advanced small cells, cloud radio access networks (cloud RANs), ultra-density networks (ultra-density networks), device to device (D2D) communications, wireless backhaul, moving networks, cooperative communications, coordinated multi-points (CoMPs), and interference cancellation, and the like have been made in 5G communication systems.

In addition, hybrid FSK and QAM modulation (FQAM) and sliding window superposition coding (SWSC), which are advanced coding modulation schemes, and filter bank multi carrier (FBMC), non-orthogonal multiple access (NOMA), and sparse code multiple access (SCMA), which are advanced access technologies, have been developed in 5G systems.

In addition, as a main use scenario of 5G new radio (5G NR), technological development has been carried out to satisfy key performance indicators of enhanced mobile broadband (eMBB), ultra-reliable low-latency communication (URLLC), and massive machine-type communication (mMTC).

By utilizing vehicle-to-everything (V2X) to detect the conditions surrounding a vehicle, it is possible to determine the surrounding situation more accurately and comprehensively by collecting information that is difficult to obtain using only on-board sensors such as a camera and front/rear/side radar.

Recently, PC5 link communication in device-to-device (D2D) communication has been considered as a method for vehicle-to-vehicle (V2V) communication, which is one of V2X technologies. PC5 link communication technology is a link communication between radio terminals, and corresponds to a communication technology in which radio terminals can directly exchange data traffic with each other. The PC5 link communication technology can confer various advantages to a mobile communication network, such as ensuring fast data transmission between adjacent terminals, mitigating a base station load, and providing location-based services.

On the other hand, in addition to vehicle-to-vehicle (V2V) communication or vehicle-to-infrastructure (V2I) communication, which has been mainly dealt with using existing V2X communication, vehicle-to-IoT (V2IoT) communication for requesting necessary information about an Internet-of-Things (IoT) terminal present near a vehicle and obtaining necessary information from the corresponding IoT terminal is possible.

However, since the IoT terminal has limited computing and processing capabilities and is sensitive to energy consumption, the communication technology used in the IoT terminal is difficult to implement in a form compatible with LTE in terms of physical aspects thereof.

IoT terminals use a narrower bandwidth than the existing LTE, and there are differences as to the modulation/demodulation method and the number of subcarriers.

In addition, when the operation of the IoT terminal is off, communication between the other terminal and the IoT terminal is impossible due to the discontinuous reception (DRX) cycle of the IoT terminal. Due to the characteristics of a vehicle terminal moving at a high speed, it is highly likely that the vehicle terminal passes the IoT terminal while the operation of the IoT terminal is off, thereby leaving the range of possible direct communication between the IoT terminal and the vehicle terminal.

Furthermore, the length of the on duration for checking whether there is a message received from the vehicle is important in order to receive the message from the vehicle clearly, but it is difficult to communicate smoothly between the vehicle and the IoT terminal by adjusting only the DRX cycle in a fixed length of the on duration.

In an LTE system, although the Quality-of-Service (QoS) and radio resource requirements of a machine-type communication (MTC) terminal and a human-type communication (HTC) terminal are different, both types of terminal undergo the same random-access contention process.

As described above, since all terminals attempting random access undergo the same contention process, in the access network, it is not possible to distinguish whether or not the terminal that has succeeded in random access is an MTC terminal or an HTC terminal, and thus the same radio resources are allocated regardless of the type of the terminal. Accordingly, inefficiency of resource utilization occurs.

Accordingly, there is provided a random-access method in which the MTC terminal and the HTC terminal select preambles in different preamble groups.

A base station defines and propagates a set of preambles to be used by the MTC terminal and the HTC terminal via a random-access channel (RACH) configuration common message.

The MTC terminal that has received the RACH configuration common message of the base station randomly selects one preamble within the preamble group allocated to the MTC terminal and transmits the preamble to the base station via a physical random-access channel (PRACH). Similarly, when the HTC terminal receives the RACH configuration message of the base station, the HTC terminal randomly selects one preamble within the preamble group allocated to the HTC terminal and transmits the preamble to the base station via the PRACH.

Accordingly, the base station can identify whether the preamble signal is sent by the MTC terminal or the HTC terminal by identifying the preamble signal sent by the terminal.

However, when random access is performed by dividing and using the RACH preambles on the basis of the type of the terminal, an environment in which the vehicle or the IoT terminal can communicate with the base station is provided, but direct communication between the vehicle and the IoT terminal is impossible.

SUMMARY

According to aspects of the disclosure, a transmission procedure and a radio resource management method for supporting interaction in a PC5 link are provided in order to solve the problem with the existing PC5 link frame structure, in which the requirement for feedback transmission is not reflected in the transmission process because only simplex resource management is considered.

In addition, according to aspects of the disclosure, there is provided a direct communication method between a vehicle and an IoT terminal that have difficulty directly communicating with each other due to physical incompatibility according to different standards.

The disclosure provides a method for a first terminal to support vehicle-to-everything (V2X) communication via first data transmission, the method including: determining radio resources for second data transmission of a second terminal; transmitting the first data including the information of the radio resources to the second terminal; and receiving the second data transmitted from the second terminal, using the radio resources.

The disclosure provides a method further including: transmitting an interaction establishment request to the second terminal; and receiving an interaction establishment response from the second terminal, wherein the interaction establishment request includes information of radio resources for transmitting the interaction establishment response of the second terminal, and the interaction establishment response includes information of radio resources for transmitting the first data of the first terminal.

The disclosure provides a method in which the interaction establishment request includes initial configuration information including at least one of an interaction operation period, an interaction operation number, or an allowable transmission delay.

The disclosure provides a method further including, when the last data transmission is completed based on the initial configuration information, transmitting an interaction termination confirmation message to the second terminal.

The disclosure provides a method in which the first data including the radio resource information is transmitted to the second terminal and a third terminal, the first data includes information about a data transmission order among the first terminal, the second terminal, and the third terminal, and the first terminal, the second terminal, and the third terminal perform data transmission sequentially based on the transmission order.

The disclosure provides a method in which the second data includes information of radio resources for transmitting third data of the third terminal, and the method further includes receiving third data transmitted from the third terminal, using radio resources for the third data transmission.

The disclosure provides a method further including: transmitting information of radio resources for third data transmission of the third terminal to the third terminal; and receiving the third data transmitted from the third terminal, using radio resources for transmitting the third data.

The disclosure provides a method further including: transmitting an interaction establishment request to the second terminal and the third terminal; and receiving interaction establishment responses from each of the second terminal and the third terminal, wherein the interaction establishment request includes length information of an interaction establishment response interval and the interaction establishment responses received from each of the second terminal and the third terminal are received within the length of the interaction establishment response interval.

The disclosure provides a method in which the interaction establishment request includes information of radio resources for transmitting the interaction establishment response of each of the second terminal and the third terminal.

The disclosure provides a method further including: transmitting an interaction termination message to the second terminal and the third terminal; and receiving interaction termination confirmation messages from the second terminal and the third terminal.

The disclosure provides a first terminal for supporting vehicle-to-everything (V2X) communication via first data transmission, the first terminal including: a control unit for determining radio resources for second data transmission of a second terminal; and a transceiving unit for transmitting the first data including information of the radio resources to the second terminal and receiving the second data transmitted from the second terminal, using the radio resources.

The disclosure provides a first terminal in which the transceiver unit transmits an interaction establishment request to the second terminal and receives an interaction establishment response from the second terminal, the interaction establishment request including information of the radio resources for transmitting the interaction establishment response of the second terminal and the interaction establishment response including information of radio resources for transmitting the first data of the first terminal.

The disclosure provides a first terminal in which the interaction establishment request includes initial configuration information including at least one of an interaction operation period, an interaction operation number, or an allowable transmission delay.

The disclosure provides a first terminal in which, when the last data transmission is completed based on the initial configuration information; the transceiver unit transmits an interaction termination confirmation message to the second terminal.

The disclosure provides a first terminal in which the transceiver unit transmits first data including the radio resource information to the second terminal and a third terminal, the first data includes information about a data transmission order among the first terminal, the second terminal, and the third terminal, and the first terminal, the second terminal, and the third terminal perform data transmission sequentially based on the transmission order.

The disclosure provides a first terminal in which the second data includes information of radio resources for transmitting third data of the third terminal and the transceiver unit receives third data transmitted from the third terminal, using radio resources for the third data transmission.

The disclosure provides a first terminal in which the transceiver unit transmits information of radio resources for third data transmission of the third terminal to the third terminal and receives the third data transmitted from the third terminal, using the radio resources for transmitting the third data.

The disclosure provides a first terminal in which the transceiver unit transmits an interaction establishment request to the second terminal and the third terminal and receives interaction establishment responses from each of the second terminal and the third terminal, wherein the interaction establishment request includes length information of an interaction establishment response interval and the interaction establishment responses received from each of the second terminal and the third terminal are received within the length of the interaction establishment response interval.

The disclosure provides a first terminal in which the interaction establishment request includes information of radio resources for transmitting the interaction establishment response of each of the second terminal and the third terminal.

The disclosure provides a first terminal in which the transceiver unit transmits an interaction termination message to the second terminal and the third terminal and receives interaction termination confirmation messages from the second terminal and the third terminal.

According to an embodiment of the disclosure, a transmitting terminal designates and transmits a radio resource to be used for feedback transmission of a receiving terminal so that Quality of Service (QoS) can be improved.

According to an embodiment of the disclosure, an IoT terminal may actively change a configuration of eDRX, thereby improving the reception rate of status messages with minimized power usage.

According to an embodiment of the disclosure, the IoT terminal may allocate radio resources to be used for transmitting a warning message to the vehicle in advance, thereby minimizing the transmission delay of the warning message.

According to an embodiment of the disclosure, by requesting radio resources for the LTE band and the NB band via a common preamble, it is possible to improve the efficiency of the radio resource request procedure.

DETAILED DESCRIPTION

Hereinafter, embodiments of the disclosure will be described in detail with reference to the accompanying drawings. In the following description of the disclosure, detailed descriptions of well-known functions or configurations will be omitted when it is determined that the detailed description may unnecessarily obscure the subject matter of the disclosure. Terms to be described later are terms defined in consideration of functions in the disclosure, and may be changed according to intentions or customs of users or operators. Therefore, the definition should be made based on the contents throughout the specification.

Prior to the detailed description of the disclosure, examples of the interpretable meanings of some terms used in the disclosure are given. However, it should be noted that the disclosure is not limited to the example of interpretation given below.

The user equipment is an entity that communicates with other user equipment or a base station, and may be referred to as a UE, a mobile station (MS), a mobile equipment (ME), a device, a terminal, or the like. Also, in the specification, the user equipment includes an Internet-of-Things (IoT) terminal, a vehicle traveling at high speed, or a terminal mounted in such a vehicle.

The base station is an entity that communicates with a terminal, and may also be referred to as a BS, a NodeB (eNB), an access point (AP), or the like.

The disclosure proposes various embodiments of a method and a device for performing efficient information exchange in a vehicle-to-everything (hereinafter, referred to as 'V2X') communication system.

Specifically, according to an embodiment of the disclosure, V2V interaction is proposed as a vehicle-to-vehicle (hereinafter, referred to as 'V2V') communication between PC5 link-based vehicles (V2V).

"Interaction" generally refers to interaction, mutual influence, and dialogue according to the dictionary meaning thereof. In the disclosure, "interaction" may refer to a communication scenario in which data is repeatedly exchanged between adjacent vehicles or terminals.

According to an embodiment of the disclosure, the interaction may be applicable to V2V communication for exchanging information between adjacent vehicles, and may support services that need to operate organically with each other via duplex information exchange such as cluster driving.

Figures 1A, 1B:
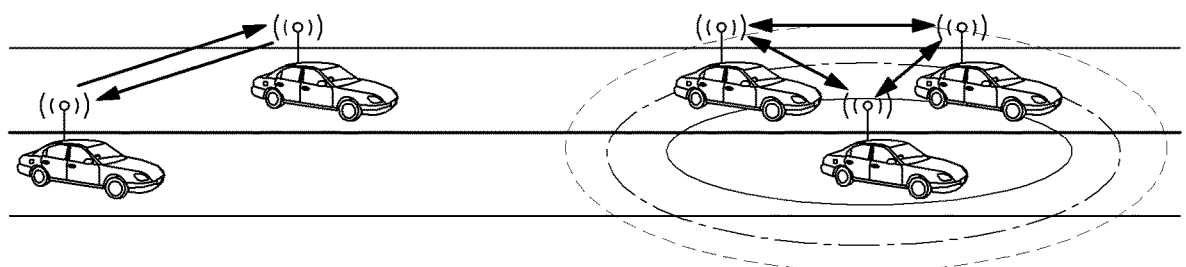
FIGS. 1A and 1B are diagrams illustrating V2V interaction scenarios according to an embodiment of the disclosure.

FIGS. 1A and 1B are diagrams illustrating V2V interaction scenarios according to an embodiment of the disclosure.

FIG. 1A illustrates one-to-one duplex interaction in the form of serial and repetitive exchange of data between two vehicles in PC5 link-based V2V communication, and FIG. 1B illustrates a point-to-multipoint (hereinafter, referred to as 'PTM') interaction in which group members exchange information in series and repeatedly in a group consisting of three or more vehicles.

In the V2V interaction shown in FIGS. 1A and 1B, location and speed information, which are directly related to safety, are characterized in that they should be delivered within a certain time delay according to service characteristics and requirements. As an example of representative services utilizing interaction, in the case of cluster driving, relative locations, speeds and the like among vehicles driving in a cluster should be continuously exchanged.

Delay or failure in information transfer in such services may result in decision errors due to lack of information at the receiving side. In addition, erroneous judgment can produce a series of errors in the information feedback process, which can greatly compromise the safety of the terminals in service.

Therefore, there is a need to minimize data transmission delay and failure in the V2V interaction from a transmitting stage to a receiving stage.

However, since the conventional PC5 link frame structure considers only simplex resource management, it does not reflect the requirements for the backward transmission that is fed back.

Accordingly, there is a need for a transmission procedure and a radio resource management method for supporting V2V interaction in a PC5 link.

Figure 2:
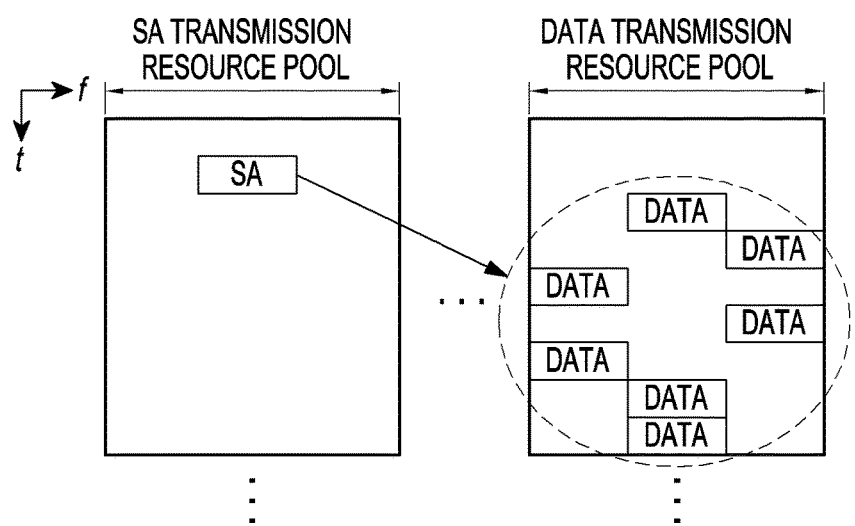
FIG. 2 is a diagram illustrating a method for transmitting and receiving data in PC5-based V2V communication in general.

FIG. 2 is a diagram illustrating a method for transmitting and receiving data in PC5-based V2V communication in general.

Referring to FIG. 2, the PC5 link communication operates based on a frame including a scheduling assignment (SA) transmission resource pool and a data transmission resource pool.

Specifically, a transmitting terminal performs broadcasting by including information on a resource pattern of transmission (RPT), that is, time and frequency axis patterns of the transmission resource, to be used in an SA message. At this time, the transmitting terminal selects any resource in an SA transmission resource pool and transmits an SA message to avoid collision with SA message transmissions of neighboring terminals.

Thereafter, the transmitting terminal transmits data via the RPT included in the SA message in the data transmission resource pool.

The receiving terminal, having received the SA message of the transmitting terminal, may selectively receive only desired data in the data transmission resource pool, based on the RPT information obtained via the SA message.

Such an existing PC5 frame structure is designed to allow one terminal to perform simplex one-time transmission, so that the transmitting terminal in the framework should transmit an SA message to inform the receiving terminal of a transmission resource pattern (RPT) for data transmission.

Accordingly, in order to exchange serial and repetitive information between two or more terminals in the existing PC5 frame structure, the two or more terminals should alternately and repeatedly perform the simplex communication as described above. In other words, in the existing PC5 framework, duplex interaction should be performed in the form of a bundle of consecutive simplex one-time transmissions.

Accordingly, in the existing PC5 frame structure, a lot of signaling overhead occurs in the duplex interaction process, and there is a limit to which Quality of Service (QoS) can be guaranteed.

According to an embodiment of the disclosure, a PC5 transmission scheme for enhanced V2V interaction is included.

Figure 3:
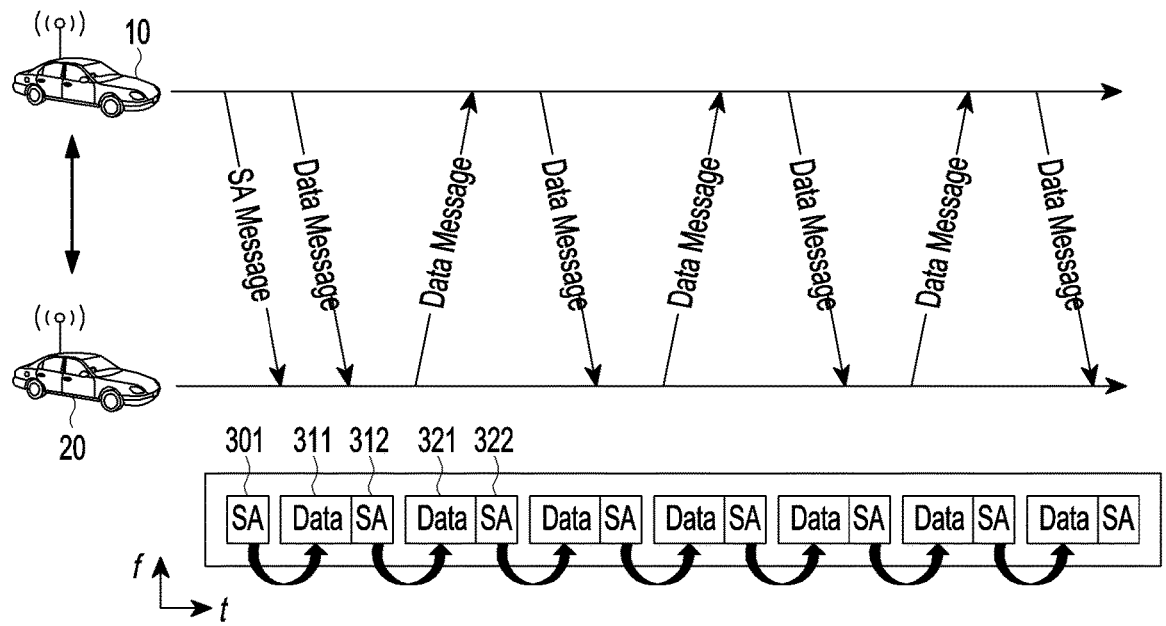
FIG. 3 is a diagram illustrating an interaction method via SA message piggybacking according to an embodiment of the disclosure.

FIG. 3 is a diagram illustrating an interaction method via SA message piggybacking according to an embodiment of the disclosure.

Referring to FIG. 3, in the interaction method according to an embodiment of the disclosure, a transmitting terminal 10 determines a radio resource for the feedback transmission of a receiving terminal 20 and transmits control information about the feedback transmission of the receiving terminal 20 when transmitting data of the transmitting terminal 10 in order to enable the use of the corresponding radio resources at the time point of feedback transmission by the receiving terminal 20. That is, when transmitting a data message of the transmitting terminal 10, an SA message for transmitting the data message of the receiving terminal 20 may be piggybacked on the data of the transmitting terminal 10 and transmitted.

As shown in FIG. 3, by transmitting the control information for data transmission of the receiving stage during data transmission of the transmitting stage, the signaling procedure required for performing interaction can be simplified compared to the PC5 link frame structure of FIG. 2, and the QoS required in the interaction process can be improved.

The transmitting stage according to an embodiment may perform resource occupancy for feedback transmission to be received from the receiving stage during data transmission for a smooth interaction operation in order for the transmitting stage to select a resource that is advantageous for the reception of the transmitting stage.

When the SA transmission resource pool and the data transmission resource pool are arranged in different subframes according to an embodiment, the terminal performing the interaction operation may continuously sense the SA transmission resource pool to identify the RPT information used in the vicinity and determine the resources to be used for feedback transmission.

In addition, the terminal also periodically senses a data transmission resource pool to identify RPT resources with low interference effects to assist in resource selection for the feedback transmission.

When the SA transmission resource pool and the data transmission resource pool are arranged in the same subframe according to another embodiment, the SA transmission resource pool information and the data transmission resource pool information are simultaneously received, so that an RPT radio resource with low interference effects is identified and a radio resource to be used for feedback transmission is selected based on the identified radio resource.

According to an embodiment of the disclosure, the transmitting terminal 10 of FIG. 3 may correspond to a request terminal 10 for requesting to perform an interaction, and the receiving terminal 20 of FIG. 3 may correspond to a response terminal 20 for responding to the interaction request of the requesting terminal. Accordingly, hereinafter, the terminal or vehicle requesting an interaction will be referred to as a 'request terminal 10', and the terminal or vehicle responding to the interaction request will be referred to as a 'response terminal 20'.

Figure 4:
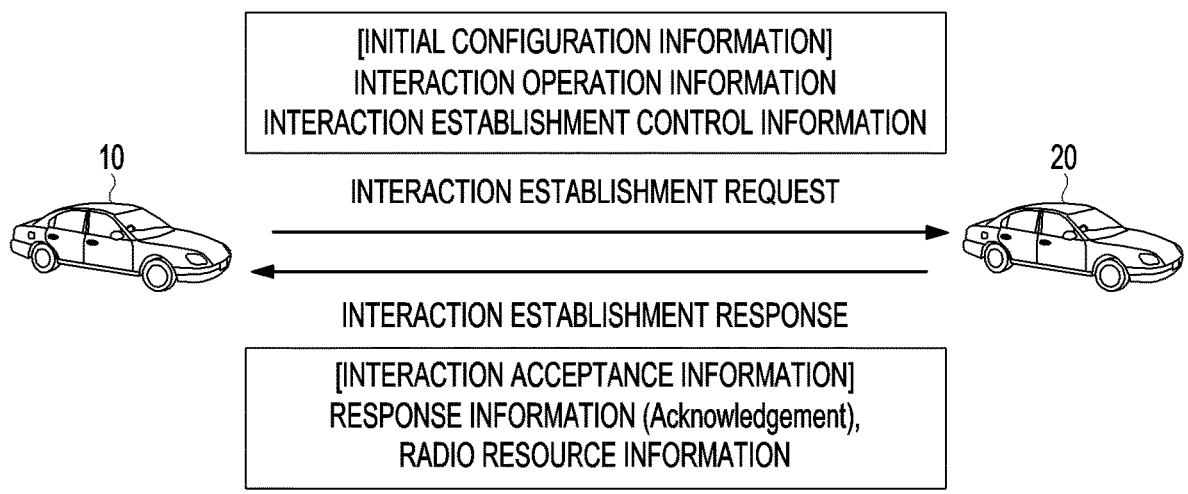
FIG. 4 is a diagram illustrating a one-to-one duplex interaction establishment method according to an embodiment of the disclosure.

FIG. 4 is a diagram illustrating a one-to-one duplex interaction establishment method according to an embodiment of the disclosure.

Referring to FIG. 4, a one-to-one duplex interaction scenario may be performed by the request terminal 10 that initiates the interaction and the response terminal 20 that receives the interaction request from the request terminal 10 and provides a response indicating whether the interaction is performed.

The request terminal 10 starts the procedure initialization for the interaction establishment by broadcasting the initial configuration information of the interaction to be performed.

The interaction initial configuration information according to an embodiment may include configuration information on the interaction operation, such as an interaction operation period, an interaction operation number, or an allowable transmission delay.

In addition, the interaction initial configuration information may include control information related to the interaction establishment response, such as an interaction response information transmission deadline or radio resource information for transmitting the response information of the response terminal 20.

The response terminal 10 may broadcast the initial configuration information via data channel transmission.

By receiving the initial configuration information transmitted from the request terminal 10, the response terminal 20, having received an interaction request, may perform the review and response to the interaction request of the request terminal 10.

When the response terminal 20 is able to participate in the interaction, the response terminal 20 may transmit interaction acceptance information as a response to the interaction request to the request terminal 10.

In addition, the interaction acceptance information of the response terminal 20 may include radio resource information to be used for data transmission in a first interaction from the request terminal 10 to the response terminal 20 after interaction establishment termination.

Meanwhile, according to another embodiment of the disclosure, when the response terminal 20 wants to perform an interaction with a requirement other than the interaction configuration information requested by the request terminal 10, the response terminal 20 may change the initial configuration information received from the request terminal 10 and retransmit the changed initial configuration information to the request terminal 10.

Upon receiving the changed initial configuration information from the response terminal 20, the request terminal 10 reviews the changed initial configuration information and transmits an interaction establishment response therefor to the response terminal 20.

As described above, when the response terminal 20 transmits the changed initial configuration information to the request terminal 10, in contrast to the illustration in FIG. 4, the request terminal 10 may operate like the response terminal, and the response terminal 20 may operate like the request terminal.

Hereinafter, the interaction method of FIG. 3, based on the interaction establishment process of FIG. 4, will be described in detail with reference to FIG. 3 again.

First, the request terminal 10 may transmit control information for transmitting interaction initial configuration information to the response terminal 20 via an SA message 301.

Thereafter, the request terminal 10 according to an embodiment transmits a data message 311 including the interaction initial configuration information for interaction request to the response terminal 20 based on the SA message 301. At this time, the request terminal 10 may piggyback radio resource information for transmitting the interaction response information of the response terminal 20, that is, the SA message 312 including the control information for the transmission of the interaction establishment response of the response terminal 20, on the interaction initial configuration information data message 311 to transmit.

The response terminal 20, having received the data message 311 of the interaction establishment request including the interaction initial configuration information, may transmit a data message 321 of the interaction establishment response including interaction acceptance information for the interaction request of the request terminal 10.

At this time, the response terminal 20 may transmit the SA message 322 including the control information for the first interaction data message to be transmitted from the request terminal 10 to the response terminal 20 after completion of the interaction establishment by piggybacking on the data message 321.

As described above, the request terminal 10 and the response terminal 20 may repeat the operation of transmitting by piggybacking the SA message including the control information for the feedback transmission of the receiving side (e.g., the request terminal 10 and the response terminal 20) on the data message of the transmitting side (e.g., the response terminal 20 and the request terminal 10), so that the interaction operation according to an embodiment of the disclosure can be performed.

Hereinafter, operations from the duplex interaction establishment process to the termination of the interaction according to an embodiment of the disclosure will be described in detail with reference to FIG. 5.

Figure 5:
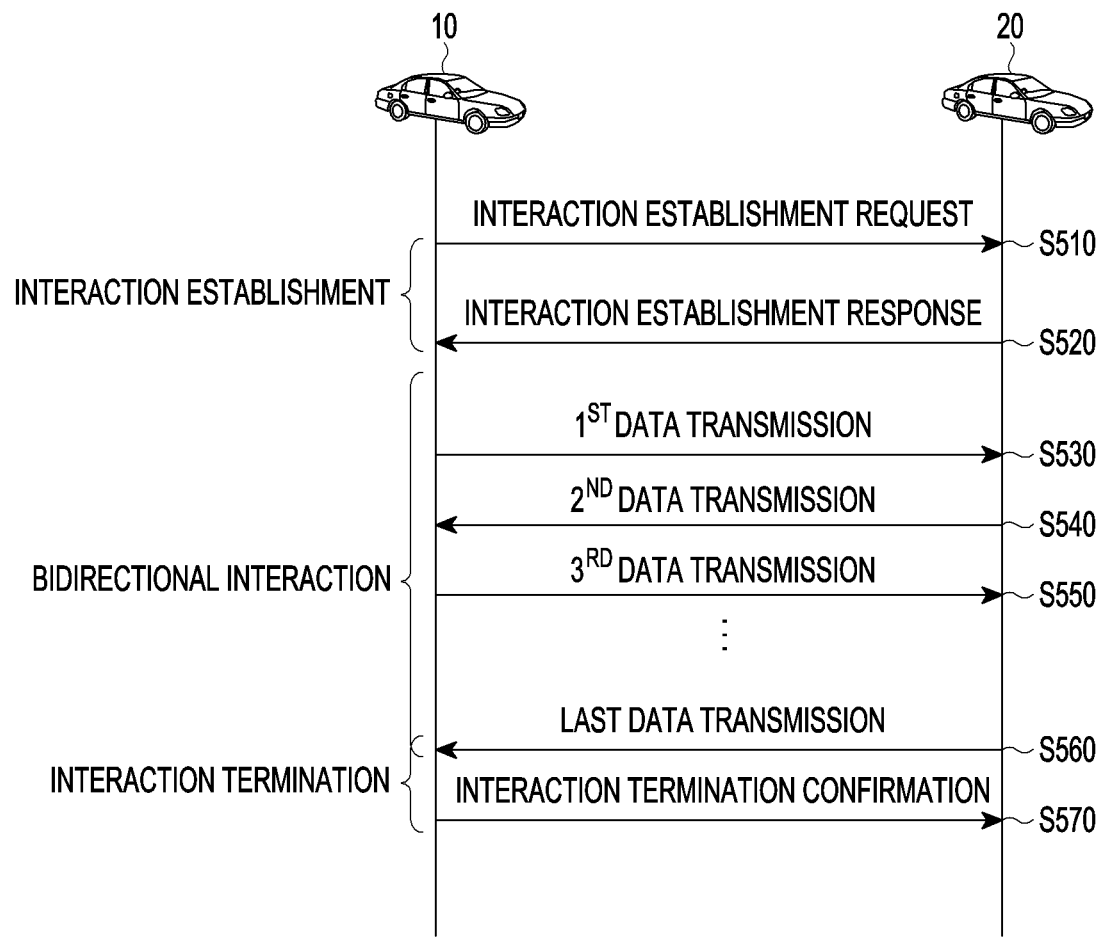
FIG. 5 is a flowchart illustrating a one-to-one duplex interaction method according to an embodiment of the disclosure over time.

FIG. 5 is a flowchart illustrating a one-to-one duplex interaction method according to an embodiment of the disclosure over time.

As described above with reference to FIG. 4, a request terminal 10 according to an embodiment may transmit an interaction establishment request including initial configuration information to a response terminal 20 (S510).

The response terminal 20, having received the interaction establishment request, may review the interaction establishment request of the request terminal 10 and transmit an interaction establishment response to the request terminal 10 (S520).

When the response terminal 20 intends to participate in the interaction, the response terminal 20 may transmit an interaction establishment response including interaction acceptance information to the request terminal 10.

According to an embodiment of the disclosure, the interaction acceptance information of the response terminal 20 may include radio resources to be used for data transmission in the first interaction from the request terminal 10 to the response terminal 20 after completion of the interaction establishment.

When the request terminal 10 receives the interaction acceptance information via the interaction establishment response transmitted by the response terminal 20 in S520, an interaction may be established between the request terminal 10 and the response terminal 20.

Accordingly, the request terminal 10 and the response terminal 20 may perform a duplex interaction starting with the interaction transmission of the request terminal 10.

The request terminal 10 may perform the first data transmission for the response terminal 20 (S530). In S530, the request terminal 10 may transmit data, using the radio resources included in the interaction acceptance information in S520.

In addition, the request terminal 10 may also transmit an SA message including radio resource information to be used for feedback transmission of the response terminal 20 (i.e., data transmission of S540) when transmitting the first data in S530. That is, the request terminal 10 may transmit the SA message for transmitting a second data message of the response terminal 20 to the response terminal 20 by piggybacking the SA message on the first data message to be transmitted. Hereinafter, a data message in which an SA message for feedback transmission of a receiving side is piggybacked on a data message of a transmitting side is referred to as an 'interaction message'.

Similarly, the response terminal 20 according to an embodiment may receive the SA message included in the interaction message of S530 from the request terminal 10 and transmit the second data to the request terminal 10 based on the radio resource information included in the SA message (S540).

The interaction message of S540 may include an SA message for the next feedback transmission, that is, the third data message transmission (i.e., data transmission of S550) of the request terminal 10.

The request terminal 10, having received the interaction message of S540 from the response terminal 20 via the second data transmission, may transmit the third data to the response terminal 20 based on the radio resource information included in the SA message of the interaction message of S540 (S550).

The request terminal 10 and the response terminal 20 may perform duplex interactions with each other by repeating the processes of S530 to S550.

According to an embodiment of the disclosure, the initial configuration information transmitted from the request terminal 10 to the response terminal 20 in S510 may include configuration information on an interaction operation. The configuration information on the interaction operation may include at least one of an interaction operation period, an interaction operation number, and an allowable transmission delay.

When the initial configuration information according to an embodiment includes an interaction operation period or an interaction operation number, the response terminal 20 may perform the last data transmission according to the interaction operation period or the interaction operation number (S560).

The request terminal 10, having received the last data transmission from the response terminal 20, may transmit an interaction termination confirmation message to the response terminal 20 (S570). As the response terminal 20 receives the interaction termination confirmation message from the request terminal 10, the duplex interaction may be terminated.

In FIG. 5, for the convenience of description, the response terminal 20 is illustrated as performing the last data transmission. However, according to an embodiment of the disclosure, the request terminal 10 may perform the last data transmission according to the initial configuration information. In this case, the interaction termination confirmation message may be transmitted from the response terminal 20 to the request terminal 10.

Meanwhile, according to another embodiment of the disclosure, the interaction termination procedure may be performed by the request terminal 10 and the response terminal 20 by exchanging interaction termination confirmation messages with each other.

In addition, when the initial configuration information does not include an interaction operation period or an interaction operation number, the interaction termination request may be transmitted when the request terminal 10 or the response terminal 20 transmits data. The response terminal 20 or the request terminal 10, having received the interaction termination request, may transmit an interaction termination confirmation for the interaction termination request.

According to an embodiment of the disclosure, data transmission may fail due to sudden deterioration of the channel environment during the interaction operation. At this time, the interaction data and radio resource allocation information of the next feedback transmission may be lost due to the data transmission failure.

Hereinafter, a method for retransmitting data when an interaction operation fails will be described with reference to FIG. 6.

Figure 6:
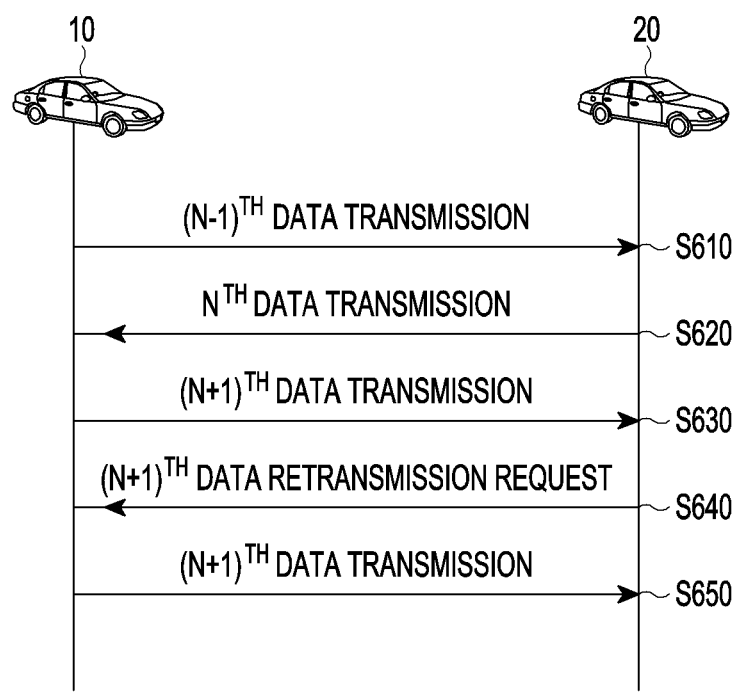
FIG. 6 is a flowchart illustrating a retransmission process for data transmission failure of one-to-one duplex interaction according to an embodiment of the disclosure over time.

FIG. 6 is a flowchart illustrating a retransmission process for data transmission failure of a one-to-one duplex interaction according to an embodiment of the disclosure over time.

In S610 and S620 of FIG. 6, as described above with reference to FIG. 5, an interaction between a request terminal 10 and a response terminal 20 may be performed.

Thereafter, when the N+1$^{th}$ data transmission of the request terminal 10 fails (S630), the response terminal 20 may request the N+1$^{th}$ data re-transmission from the request terminal 10 (S640).

The response terminal 20 according to an embodiment may recognize that the N+1$^{th}$ data transmission of S630 has failed when the feedback transmission is not received in the specified radio resource in the SA message included in the interaction message transmitted to the request terminal 10 in S620.

The response terminal 20 according to an embodiment of the disclosure may request data retransmission of S640 from the request terminal 10 when detecting a data transmission failure, and the data retransmission request may be performed by SA broadcasting and data transmission described in FIG. 2. That is, the response terminal 20 may transmit a data message for the data retransmission request via the RPT included in the broadcasted SA message, after SA broadcasting.

At this time, the response terminal 20 may transmit a data retransmission request including radio resource information to be used in data retransmission of the request terminal 10 (i.e., N+1$^{th}$ data transmission of S650) to the request terminal 10.

The request terminal 10 that has been requested to perform retransmission may retransmit the N+1$^{th}$ data requested to be retransmitted using the radio resource information included in the retransmission request message of S640 (S650).

In S650, the request terminal 10 according to an embodiment may perform transmission by including new radio resource information for receiving the next feedback transmission of the response terminal 20 in retransmission data.

Although FIG. 6 illustrates only the case in which data transmission of the request terminal 10 fails for the convenience of description, according to an embodiment of the disclosure, the data transmission failures may occur both in the request terminal 10 and in the response terminal 20, and the receiving side of the failed data transmission may request data retransmission.

According to an embodiment of the disclosure, as yet another example of the V2V interaction scenario, a PTM interaction shown in FIG. 1B may be provided.

Figure 7:
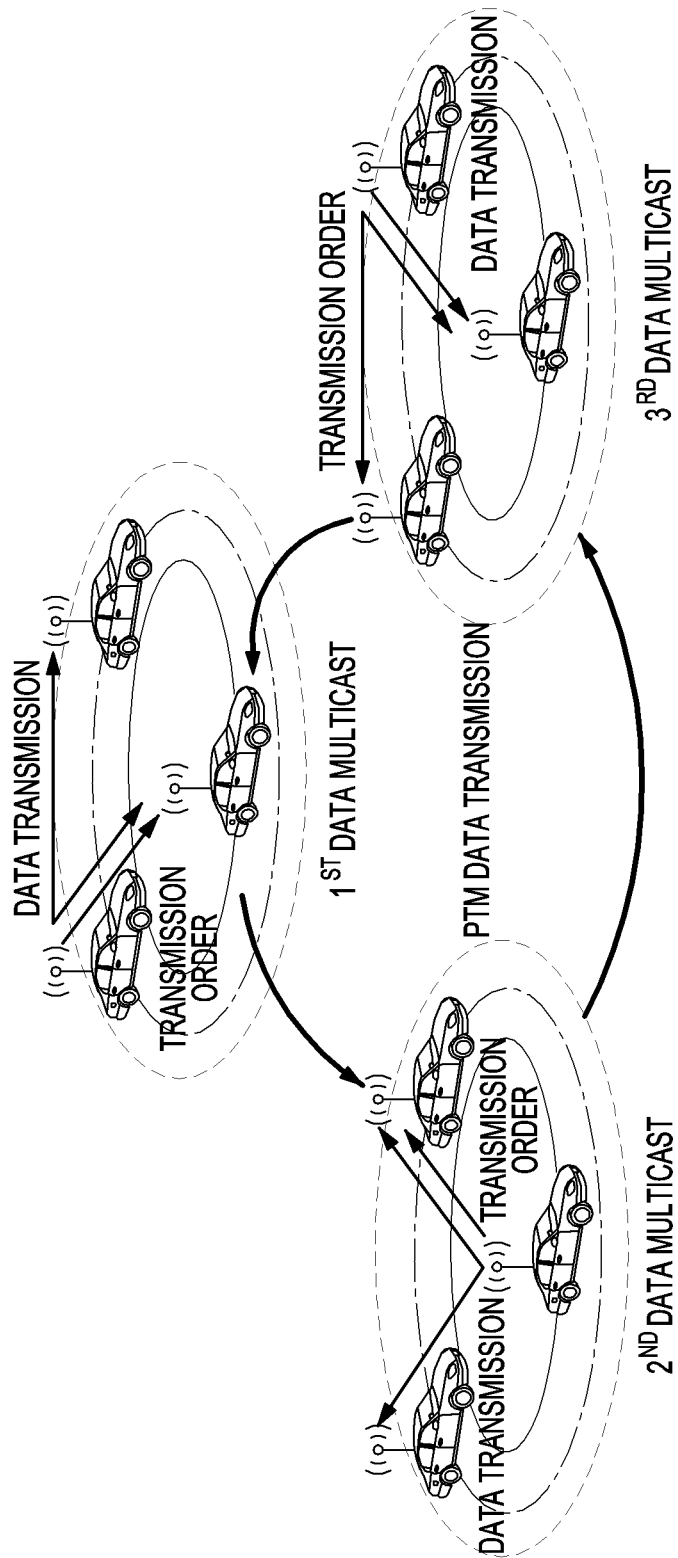
FIG. 7 is a diagram schematically illustrating a PTM interaction scenario according to an embodiment of the disclosure.

FIG. 7 is a diagram schematically illustrating a PTM interaction scenario according to an embodiment of the disclosure.

In the PTM interaction according to an embodiment, an interaction-requesting terminal may centrally manage configuration information on interaction operations such as an interaction interval length, a transmission order, a transmission terminal, a transmission order, and the like.

This is because the interaction in the group can be smoothly operated when the data transmission order is managed for the interaction between the terminals of the PTM group.

Referring to FIG. 7, the terminals in the PTM group may sequentially perform data multicast in a predetermined transmission order.

That is, a request terminal of the PTM group according to an embodiment of the disclosure (hereinafter, referred to as a 'PTM request terminal') may be a manager of the corresponding PTM group to manage the interaction operations in the group and the transmission order of response terminals (hereinafter, referred to as 'PTM response terminals').

As such, in the PTM interaction of FIG. 7, additional control information about a transmission order may be managed compared to the one-to-one duplex interaction scenario of FIGS. 3 to 6.

Hereinafter, as an interaction operation procedure not specifically described in FIGS. 7 to 10, interaction operation steps such as interaction establishment request and response of one-to-one duplex interaction, or SA message piggybacking described above with reference to FIGS. 1 to 6, may also be applied to the PTM interaction according to an embodiment of the disclosure.

The PTM request terminal according to an embodiment of the disclosure broadcasts initial configuration information such as a list of target terminals to perform the PTM interaction, an operation period of the PTM interaction, an interaction operation count, an allowable transmission delay, or interaction acceptance interval length information, thereby requesting an interaction operation.

The PTM response terminals that have received the broadcasted initial configuration information may transmit an intention to participate in the PTM interaction to the PTM request terminal via a PTM interaction response.

The PTM request terminal according to an embodiment may determine the PTM response terminal to participate in the PTM interaction based on the response result in the PTM interaction acceptance period. Accordingly, the PTM request terminal according to an embodiment may include the length information of the PTM interaction acceptance period in the initial configuration information when the interaction is requested to determine the PTM response terminal.

When the establishment of the PTM interaction between the PTM request terminal and the PTM response terminals is completed, the PTM interaction operation may commence.

The PTM request terminal according to an embodiment of the disclosure may manage a list of PTM response terminals.

Hereinafter, a transmission section determined by a predetermined section or a predetermined number of times for transmission control of the PTM interaction is defined as a 'round'. In the PTM interaction according to an embodiment of the disclosure, the length of the transmission section or the number of data transmissions included in each round may be configured differently according to each PTM interaction.

Hereinafter, a PTM interaction operation after the PTM interaction is established according to an embodiment of the disclosure will be described in detail with reference to FIGS. 8 and 9.

Figure 8:
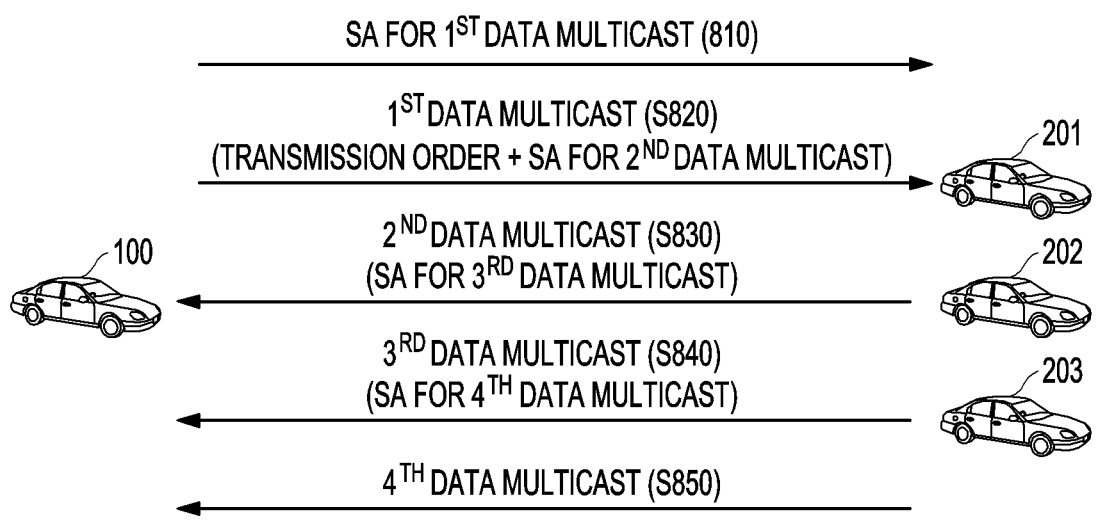
FIG. 8 is a diagram illustrating a PTM interaction transmission order designation method according to an embodiment of the disclosure.

FIG. 8 is a diagram illustrating a PTM interaction transmission order designation method according to an embodiment of the disclosure.

According to an embodiment of the disclosure, after the establishment of the PTM interaction, a PTM request terminal 100 may perform SA broadcasting for the first data multicast (S810).

The PTM request terminal 100 according to an embodiment may perform the first data multicast via a transmission resource of the SA message broadcasted in S810 (S820).

According to an embodiment of the disclosure, the PTM request terminal 100 may also provide a transmission order of the PTM group for the PTM interaction of the corresponding round in the first data multicast of S820.

According to an embodiment of the disclosure, the PTM request terminal 100 provides the transmission order for each round in advance in the first transmission of each round for the PRM interaction so that the PTM response terminals 201, 202 and 203 may sequentially perform data multicast according to the transmission order provided from the PTM request terminal 100.

In the first data multicast of S820, the PTM request terminal 100 according to an embodiment may piggyback only the SA message for second data multicast (i.e., the data multicast of S830) to perform the first data multicast.

Thereafter, the first PTM response terminal 201 may perform the second data multicast based on the SA message received in S820 (S830). At this time, an SA message for the third data multicast (i.e., data multicast of S840) may be piggybacked on the second data multicast of S830.

According to an embodiment, the first PTM response terminal 201 may be a terminal designated to perform the second data multicast in the transmission order provided in S820.

The second PTM response terminal 202 and the third PTM response terminal 203 may also perform the third data multicast S840 and a fourth data multicast S850, respectively, according to the transmission order provided by the PTM request terminal 100 in S820.

Figure 9:
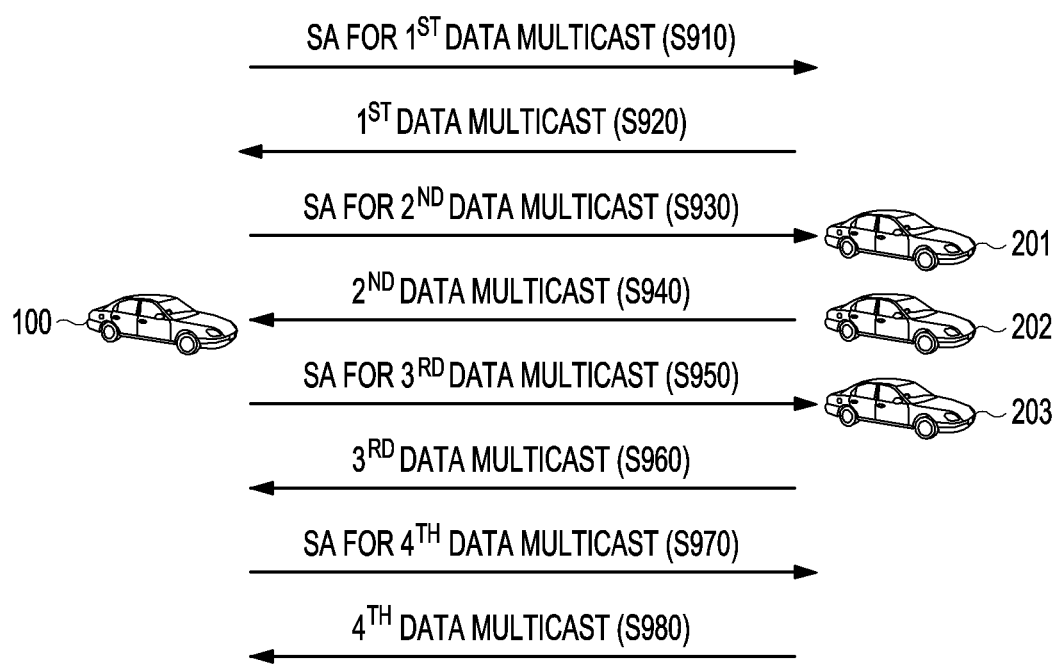
FIG. 9 is a diagram illustrating a PTM interaction transmission order designation method according to another embodiment of the disclosure.

FIG. 9 is a diagram illustrating a PTM interaction transmission order designation method according to another embodiment of the disclosure.

FIG. 9 illustrates a method in which the PTM request terminal 100 directly designates transmission resources for the data multicast of each of PTM response terminals 201, 202 and 203.

Since S910 of FIG. 9 may be configured as the same step as S810 of FIG. 8, a detailed description thereof will be omitted. The PTM request terminal 100 of FIG. 9 may perform first data multicast via a transmission resource of the SA message broadcasted in S910 (S920).

Thereafter, the PTM request terminal 100 of FIG. 9 may designate a terminal to perform the corresponding data multicast and radio resource information to be used to transmit the corresponding data message before each data multicast and transmit an SA message to the terminal to perform the corresponding data multicast.

That is, the PTM request terminal 100 of FIG. 9 may transmit an SA message including information of a terminal to perform second data multicast and radio resource information to be used for transmitting a second data message to the terminal to perform the second data multicast (S930). If the terminal to perform the second multicast is designated as the first PTM response terminal 201 by the PTM request terminal 100, the PTM request terminal 100 may transmit the SA message of S930 to the first PTM response terminal 201.

The first PTM response terminal 201, having received the SA message of S930, may perform the second data multicast based on the SA message (S940).

Each of the operations of S950 to S980 may be performed in the same manner as the operations of S930 and S940 described above.

Although FIG. 9 illustrates that the PTM request terminal 100 transmits the SA message for transmitting each data message to the terminal to perform the corresponding data multicast, according to another embodiment of the disclosure, the PTM request terminal 100 may broadcast SA messages for each data message transmission to all PTM response terminals 201, 202, and 203.

Hereinafter, operations from a process of establishing a PTM interaction to a process of terminating the PTM interaction according to an embodiment of the disclosure will be described with reference to FIG. 10.

Figure 10:
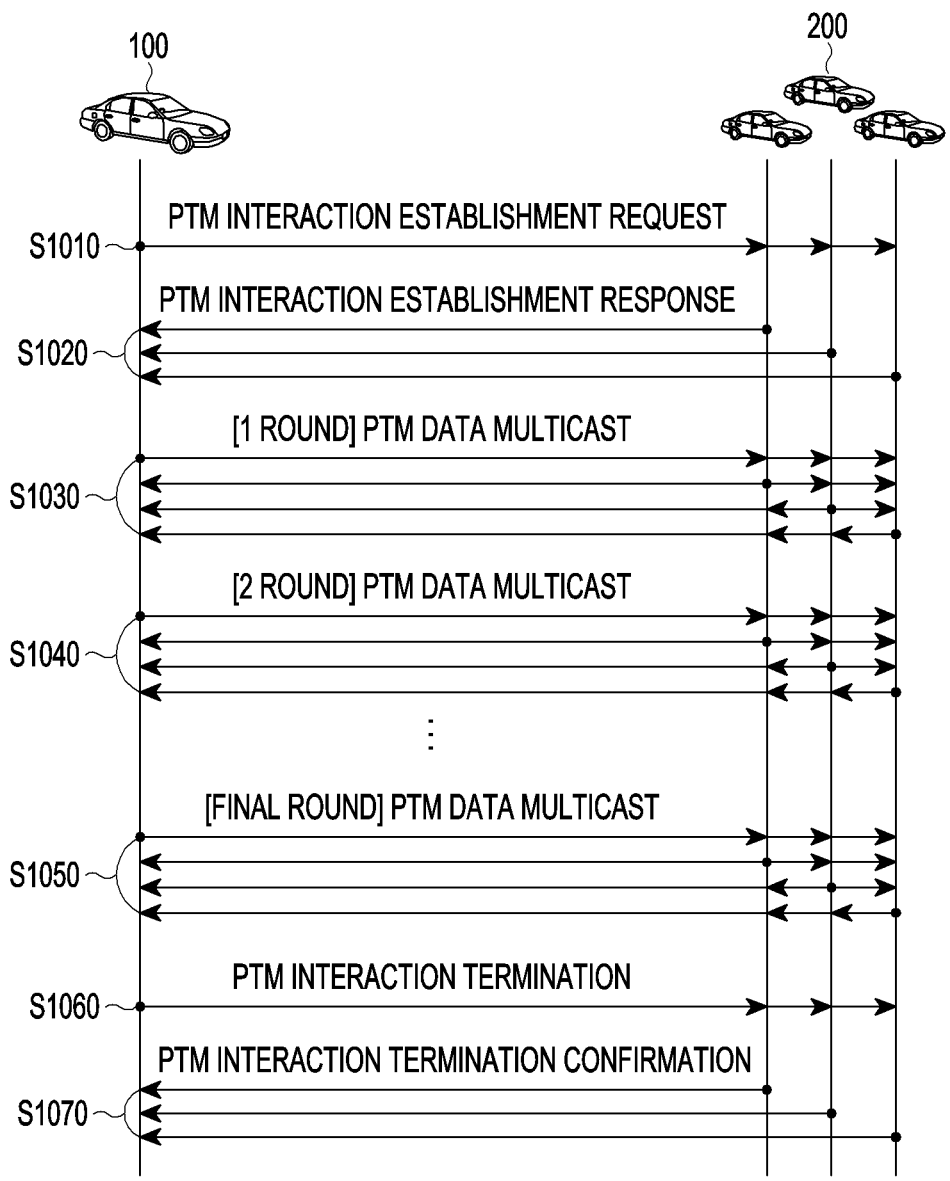
FIG. 10 is a flowchart illustrating a PTM interaction method according to an embodiment of the disclosure over time.

FIG. 10 is a flowchart illustrating a PTM interaction method according to an embodiment of the disclosure over time.

Referring to FIG. 10, first, a PTM request terminal 100 may transmit a PTM interaction establishment request to PTM response terminals 200 (S1010).

Among the PTM response terminals 200 that have received the PTM interaction establishment request from the PTM request terminal 100, the PTM response terminal 200 that intends to participate in the PTM interaction may send a PTM interaction establishment response to the PTM request terminal 100 (S1020).

The PTM request terminal 100 may determine the establishment of the PTM interaction based on the PTM interaction establishment response received during the PTM interaction acceptance period.

If the establishment of the PTM interaction is determined, PTM data multicast may be performed (S1030 to S1050).

The PTM data multicast process may be performed in each round unit determined by a predetermined interval or a predetermined number of times.

The PTM request terminal 100 according to an embodiment of the disclosure may include configuration information on interaction operations, such as a PTM interaction operation period, the number of rounds of the PTM interaction, allowable transmission delays, or the like when transmitting a PTM interaction establishment request to each of the PTM response terminals 200 in S1010.

According to an embodiment of the disclosure, each data multicast operation performed in each round of S1030 to S1050 may be performed as described above with reference to FIG. 8 or FIG. 9.

When the last round of the data multicast is completed, the PTM request terminal 100 according to an embodiment may transmit a PTM interaction termination message for introducing the PTM interaction termination to each of the PTM response terminals 200 (S1060).

The PTM response terminals 200, having received the PTM interaction termination message, may transmit a PTM interaction termination confirmation message to the PTM request terminal 100 (S1070).

According to an embodiment of the disclosure, the PTM interaction termination confirmation messages may also be sequentially transmitted by each of the PTM response terminals 200 according to the transmission order information provided from the PTM request terminal 100, as shown in FIG. 8 or FIG. 9.

As the PTM request terminal 100 receives the PTM interaction termination confirmation messages of the PTM response terminals 200, the PTM interactions between the PTM request terminal 100 and the PTM response terminals 200 may be terminated.

Meanwhile, according to an embodiment of the disclosure, the PTM request terminal 100 may perform a procedure of converging retransmission requests for data that failed to be transmitted from the PTM response terminals 200 at the end of each round.

The PTM request terminal 100 according to an embodiment may allocate radio resources for each of the PTM response terminals 200 to transmit a retransmission request message to each of the PTM response terminals 200, respectively, and the PTM response terminal 200 in which unreceived data exists during the round may perform a data retransmission request, using the allocated radio resources.

In this case, the PTM request terminal 100 may allocate radio resources to be used in data retransmission of the terminal that receives the retransmission request, and the terminal that receives the retransmission request may perform retransmission via the allocated radio resources.

The one-to-one duplex interaction operation and one-to-many PTM interaction operation according to an embodiment of the disclosure may include operations of transmitting an SA message and a data message, as described above.

The SA message according to an embodiment may include information necessary for a receiving terminal to receive data transmitted in a data channel, such as a message reception target terminal ID, a data message transmission location (i.e., a radio resource), a repetition pattern, or the like.

In the interaction according to an embodiment of the disclosure, the transmitting terminal may transmit an SA message for transmission of the next feedback data of the receiving terminal by piggybacking on a data message of the transmitting terminal.

The receiving terminal according to an embodiment may grasp the type and configuration of the received message to extract control information included in the SA message from the received data message.

According to an embodiment of the disclosure, the SA message may include the type information of the interaction message transmitted from the data channel, thereby obtaining different control information according to the interaction scenario.

The receiving terminal according to an embodiment may obtain control information from the interaction message received from the data channel message based on the interaction message type information.

According to an embodiment of the disclosure, the interaction message transmitted from the data channel may include different information according to the type information of the interaction message.

For example, an interaction request message may include interaction initial configuration information as a message used for providing initial configuration information of the interaction. The interaction initial configuration information may include at least one of an interaction period, an interaction cycle, an interaction operation number, or an allowable transmission delay.

In addition, an interaction acceptance message may be used when sending an acceptance response for the interaction request, and may include interaction acceptance information. In the case of the one-to-one duplex interaction according to an embodiment of the disclosure, the interaction acceptance information may include radio resource information to be used for first interaction data reception.

An interaction modification message according to an embodiment may be used to provide changed interaction initial configuration information when a response terminal intends to change the interaction initial configuration information received from a request terminal.

An interaction data message according to an embodiment may include interaction data information, and in the case of the one-to-one duplex interaction, may include radio resource information for feedback data reception. In addition, according to an embodiment of the disclosure, the interaction data message may further include information on the next transmission order in the one-to-many PTM interaction.

An interaction termination message and an interaction termination confirmation message according to an embodiment may be used for an interaction termination procedure.

A PTM interaction renewal message according to an embodiment may be used to provide information of a terminal that intends to newly participate or to stop participating in an interaction in a one-to-many PTM interaction process.

Hereinafter, the SA message and data message transmission for the interaction operation according to an embodiment of the disclosure will be described in detail with reference to FIGS. 11 to 13.

Figure 11A:
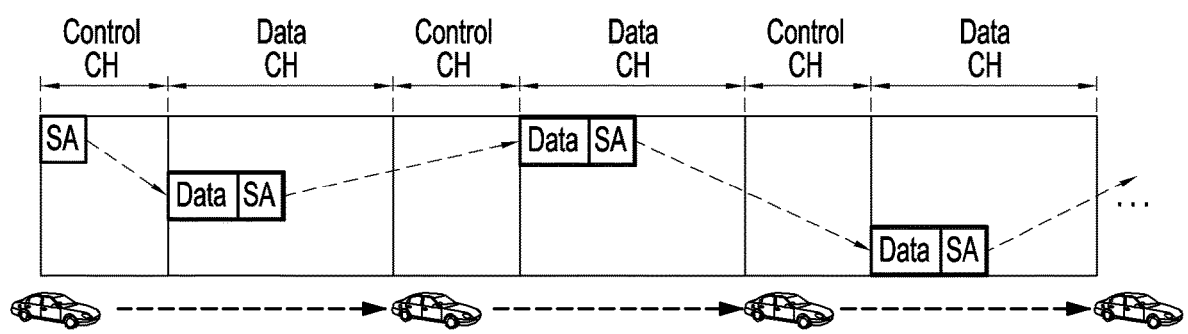
FIGS. 11A and 11B are diagrams illustrating various examples of a method for transmitting an SA message when transmissions of a control channel and a data channel are performed in separate time slots according to an embodiment of the disclosure.
Figure 11B:
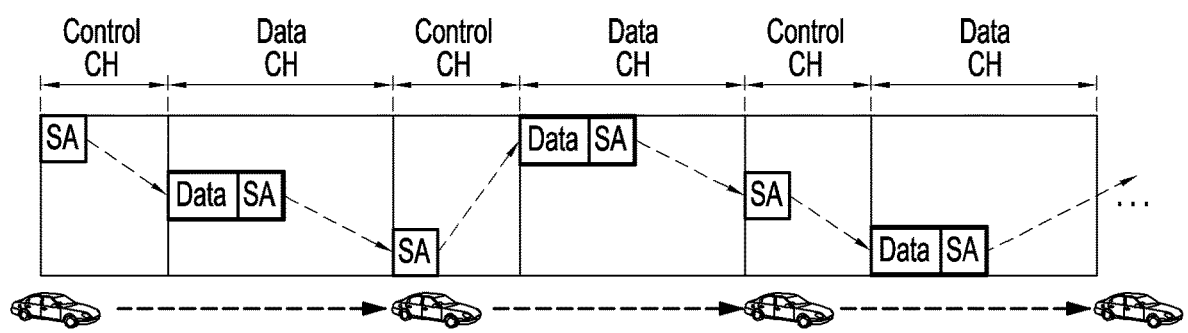

FIGS. 11A and 11B are diagrams illustrating various examples of a method of transmitting an SA message when the transmissions of control channel and data channel are performed in separate time slots according to an embodiment of the disclosure.

FIG. 11A illustrates the case in which SA message transmission in a control channel can be omitted when the transmissions of the control channel and data channel are performed in separate time slots according to an embodiment of the disclosure.

In FIG. 11A, a transmitting terminal may transmit an SA message including resource allocation information to be used for receiving feedback data by piggybacking on a data message. Accordingly, when receiving the data message, the receiving terminal may also acquire resource information to be used for its own feedback transmission (i.e., the data transmission of the receiving terminal) and perform feedback transmission to the transmitting terminal according to the allocated resource information.

In FIG. 11A, the transmitting terminal and the receiving terminal may piggyback the SA message for the next feedback transmission on the data message transmitted from the data channel, thereby supporting interaction in which the resource occupancy procedure via the transmission of the SA message in a separate control channel is omitted.

FIG. 11B illustrates a case in which SA message transmission in a control is unable to be omitted when transmissions of the control channel and data channel are performed in separate time slots according to an embodiment of the disclosure.

In FIG. 11B, the transmitting terminal may transmit an SA message for transmission of the next feedback of the receiving terminal by piggybacking on a data message transmitted from the data channel.

Meanwhile, the receiving terminal of FIG. 11B may transmit resource occupancy information for feedback transmission of the receiving terminal in a separate control channel as an SA message based on the radio resource occupancy information included in the SA message transmitted from the transmitting terminal via the data channel.

According to an embodiment of the disclosure, via the operations shown in FIG. 11B, the receiving terminal may retransmit the resource allocation information designated by the transmitting terminal as a separate SA message to the transmitting terminal, thereby performing a function of mutual confirmation.

In addition, according to the embodiment of FIG. 11B, when the receiving terminal cannot use the resource designated by the transmitting terminal, the receiving terminal may occupy another radio resource and transmit resource occupancy information thereof to the transmitting terminal, thereby supporting a function of changing the radio resource.

In addition, according to the embodiment of FIG. 11B, it is possible to inform the neighboring terminals of the resource occupancy information, thereby obtaining an effect of preventing transmission collision between the terminals.

Figure 12A:
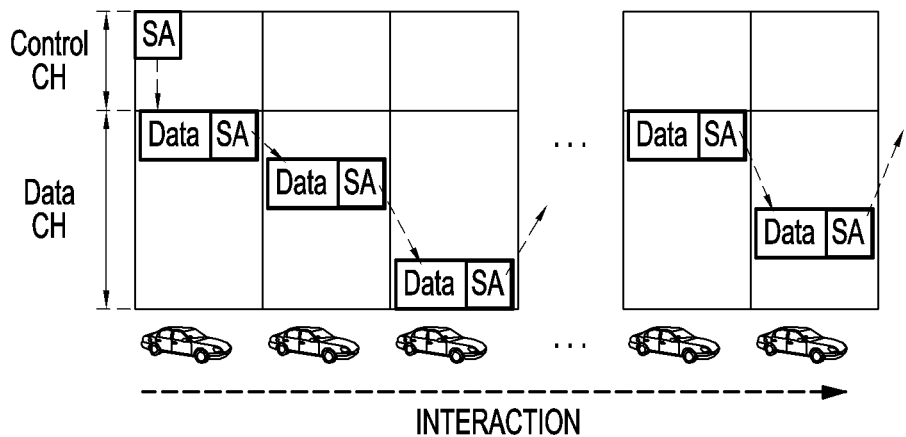
FIGS. 12A and 12B are diagrams illustrating various examples of a method for transmitting an SA message when transmissions of a control channel and a data channel are performed in the same time slot according to an embodiment of the disclosure.
Figure 12B:
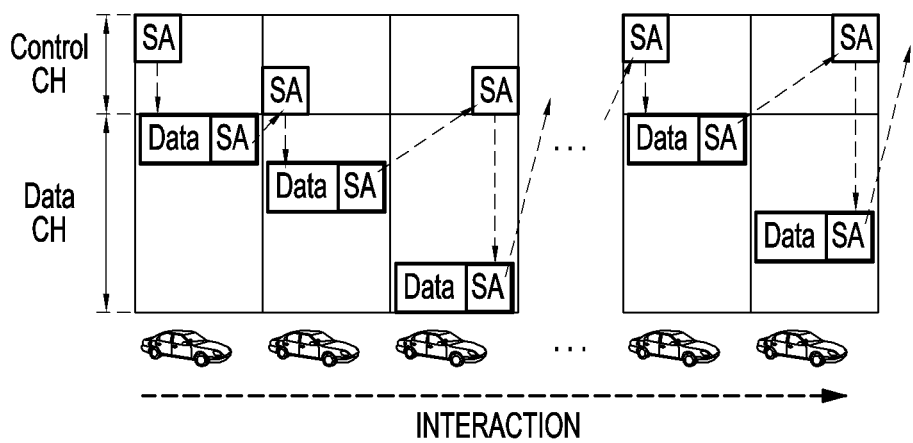

FIGS. 12A and 12B are diagrams illustrating various examples of a method of transmitting an SA message when transmissions of the control channel and data channel are performed in the same time slot according to an embodiment of the disclosure.

FIG. 12A illustrates the case in which SA message transmission in the control channel can be omitted when transmissions of the control channel and data channel are performed in the same time slot according to an embodiment of the disclosure.

The transmitting terminal of FIG. 12A may propagate an SA message including resource occupancy information in the control channel located in the same time slot as the data channel during initial transmission to indicate the transmission location of a first data message.

The receiving terminal of FIG. 12A may simultaneously receive signals of the entire band and selectively decode only necessary signals, based on the received SA information.

In the case of FIG. 12A according to an embodiment, a separate SA transmission can be omitted by transmitting the SA message about the resource occupancy information necessary for subsequent transmission by piggybacking on the data message, and the resource efficiency can be improved by reducing the portion of resources allocated to the control channel.

FIG. 12B illustrates the case in which the SA message transmission in a control channel cannot be omitted when transmissions of the control channel and data channel are performed in the same time slot according to an embodiment of the disclosure.

According to an embodiment, the operation of FIG. 12B can increase the success rate of data transmission by reconfirming the radio resources to be used by each transmitting terminal and the receiving terminal via a separate control channel in an interaction scenario in which the transmitting terminal and the receiving terminal exchange data continuously.

In the case of FIG. 12B, since the SA message and the data message are transmitted in the same time slot, it is possible to support an interaction scenario of a short period compared to the operation of FIG. 11B, in which the SA message and the data message are transmitted in different time slots.

Figure 13:
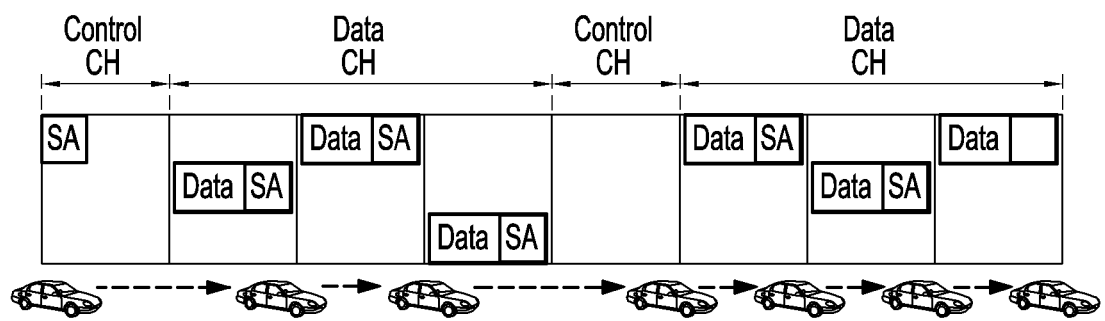
FIG. 13 is a diagram illustrating a method for transmitting an SA message and a data message when one control channel is used for managing multiple data channels according to an embodiment of the disclosure.

FIG. 13 is a diagram illustrating a method of transmitting an SA message and a data message when one control channel is used for managing multiple data channels according to an embodiment of the disclosure.

According to an embodiment of the disclosure, as illustrated in FIG. 13, since resource information for the next feedback transmission can be transmitted together with the data message in the data channel, a plurality of interactions may be performed in the continuous data channel without using a separate control channel.

Accordingly, in the case of FIG. 13, it is possible to perform a shorter cycle of interaction transmission than an interaction using a control channel.

Hereinafter, as a V2X communication system provided according to another embodiment of the disclosure, V2IoT direct communication between a vehicle and an Internet-of-Things (IoT) terminal will be described with reference to FIGS. 14 to 25.

Figure 14:
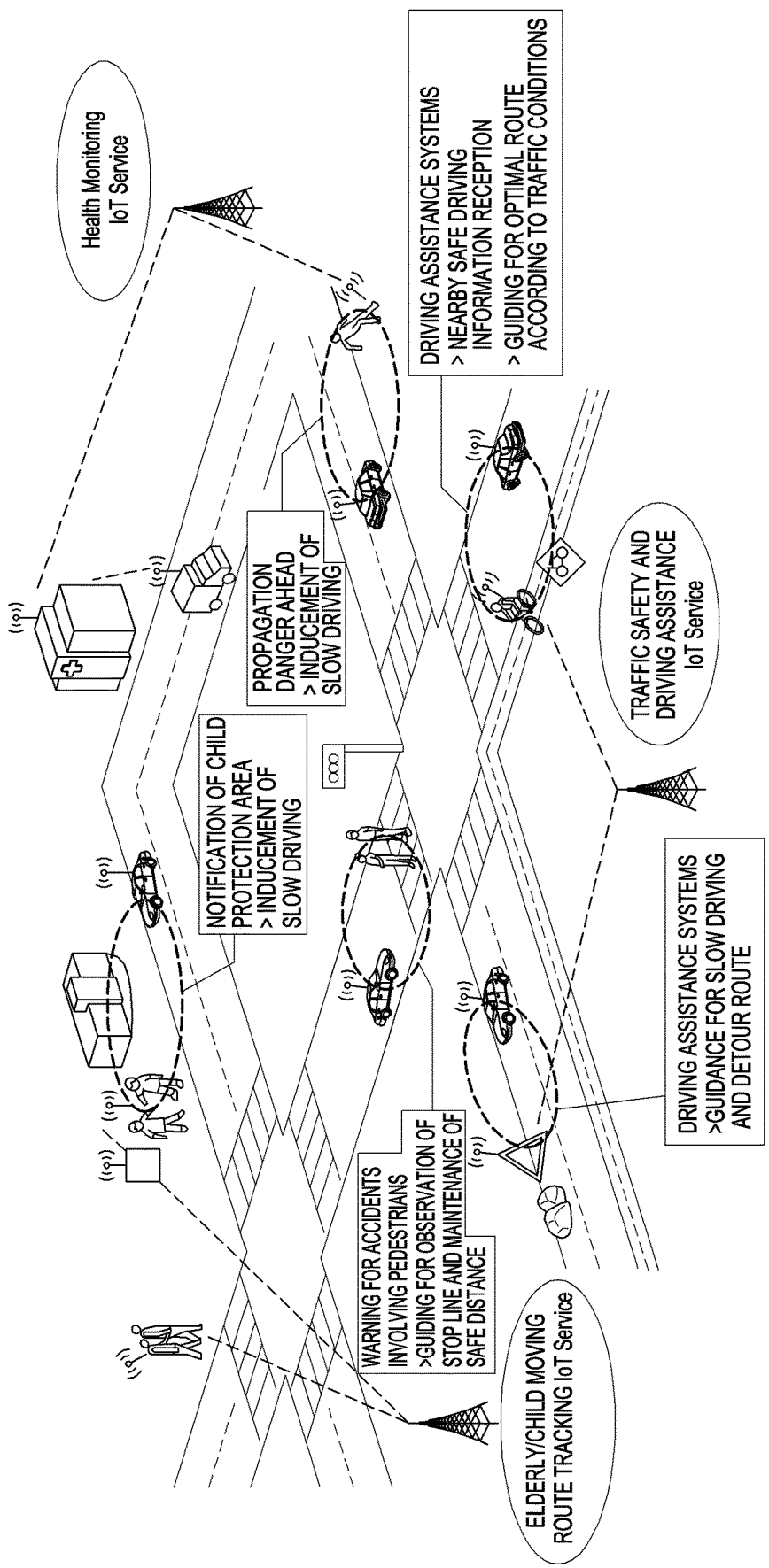
FIG. 14 is a diagram illustrating examples of a service utilizing V2IoT communication.

FIG. 14 is a diagram illustrating examples of a service utilizing V2IoT communication.

Referring to FIG. 14, an IoT terminal used for tracking the elderly and children can be recognized by a vehicle to induce slow driving and attract a driver's attention. In addition, when a human-body-attached IoT terminal constituting a health-monitoring system detects an abnormal health condition and broadcasts an emergency message, the vehicle may recognize the emergency message so as to prevent a secondary accident from occurring. In addition, when rocks fall or an accident occurs on the road, an IoT terminal attached to a safety tripod may guide vehicles to a detour.

As described above, in order to enable V2IoT-based services, direct communication between the vehicle and the IoT terminal is essential.

In general, the V2X performs communication using a Legacy long-term evolution (LTE) band, and the IoT service uses a narrow band (NB) compared to the Legacy LTE band.

The V2IoT communication according to an embodiment of the disclosure may be performed by the IoT terminal communicating with the vehicle in the legacy LTE band or by a vehicle communicating with the IoT terminal in the NB band.

First, the V2IoT communication method via the LTE band will be described with reference to FIGS. 15 to 17.

Figure 15:
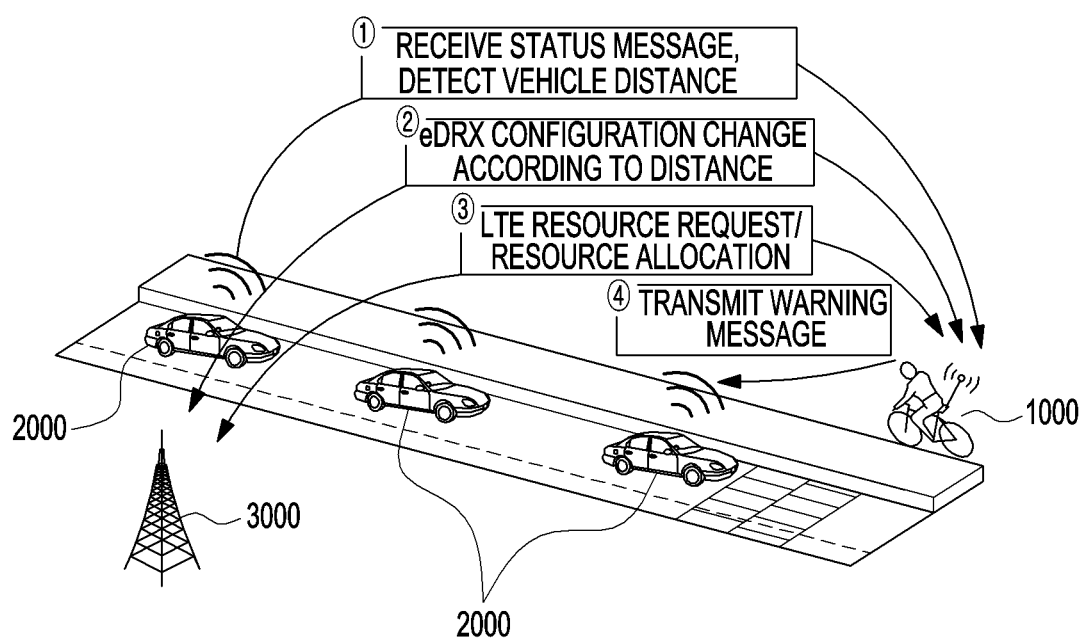
FIG. 15 is a diagram schematically illustrating a communication method between terminals via an LTE band according to an embodiment of the disclosure.

FIG. 15 is a diagram schematically illustrating a communication method between terminals via an LTE band according to an embodiment of the disclosure.

In the communication method between terminals via the LTE band according to an embodiment of the disclosure, it may be assumed that an IoT terminal 1000 is equipped with a dual interface to perform a legacy LTE operation.

Referring to FIG. 15, the IoT terminal 1000 may transmit IoT data to a base station in the NB band, and receive a status message transmitted by a vehicle terminal 2000 in the legacy LTE band.

The status message may include information such as a vehicle's location, direction of movement, or speed, and may be periodically transmitted.

The IoT terminal 1000 according to an embodiment can prevent a traffic accident by transmitting a warning message to the vehicle terminal 2000 based on the received status message.

Hereinafter, a detailed procedure of the terminal-to-device communication method via the LTE band will be described above with reference to FIG. 16.

Figure 16:
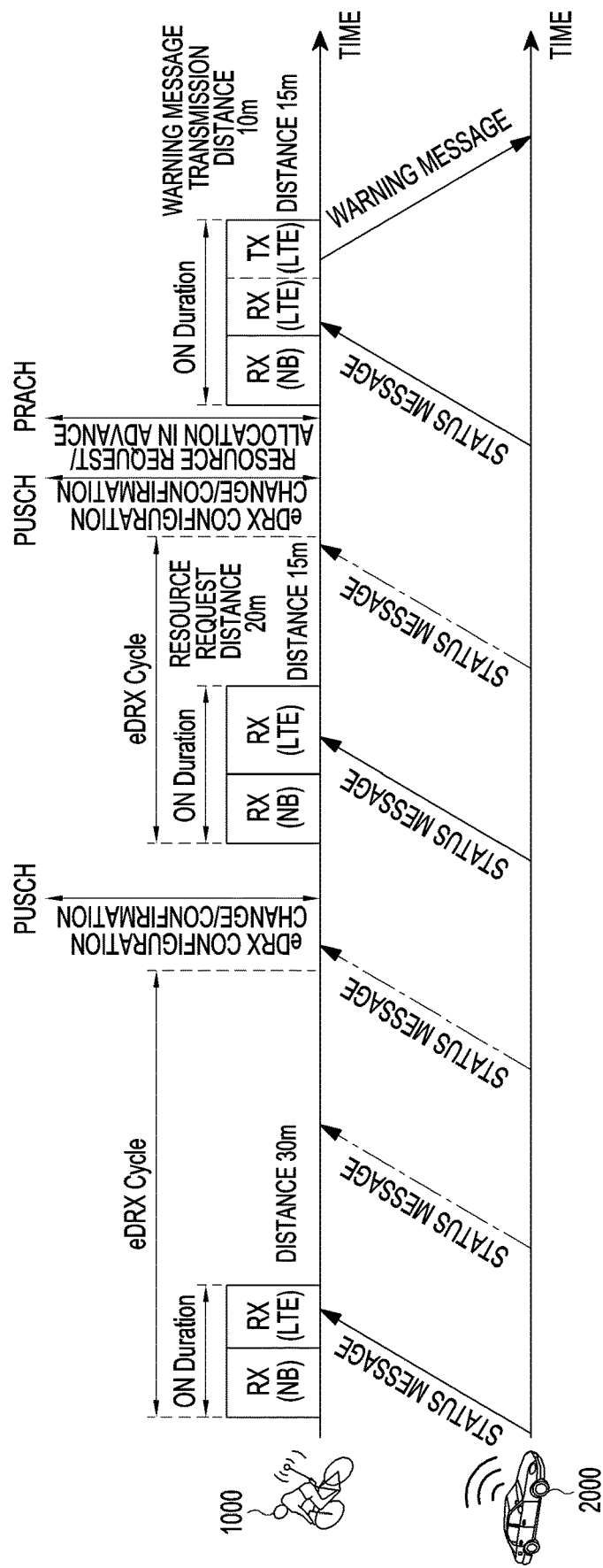
FIG. 16 is a diagram illustrating in detail a communication method between terminals via an LTE band according to an embodiment of the disclosure.

FIG. 16 is a diagram illustrating in detail a communication method between terminals via an LTE band according to an embodiment of the disclosure.

The IoT terminal 1000 according to an embodiment may perform an extended discontinuous reception (eDRX) operation of alternately switching on and sleeping by periodically scheduling times for monitoring whether there is data to be received from the network.

However, there is a possibility that the IoT terminal 1000 may not properly receive the status message of the vehicle terminal 2000 requiring a real-time response due to the eDRX operation. That is, when the IoT terminal 1000 is in a sleep state, there is a risk that a traffic accident may occur because the IoT terminal 1000 cannot receive the status message of the vehicle terminal 2000.

Accordingly, according to an embodiment of the disclosure, as the IoT terminal 1000 uses the dual interface, the ON duration for performing downlink monitoring from the existing network may be divided into legacy LTE band monitoring and NB band monitoring. In addition, the IoT terminal 1000 according to an embodiment of the disclosure may adjust the eDRX cycle according to the degree of risk or emergency.

Specifically, the IoT terminal 1000 according to an embodiment may divide an ON duration into sections for monitoring a legacy LTE band and an NB band and utilize the same. In addition, the IoT terminal 1000 may request the network for information on the total length of the ON duration and the LTE band monitoring ratio of a section for monitoring the LTE band.

The IoT terminal 1000 according to an embodiment of the disclosure may request the network by including the LTE band monitoring ratio information in a tracking area update (TAU) request message for adjusting the eDRX cycle.

Accordingly, the IoT terminal 1000 according to an embodiment may receive a status message of the vehicle terminal 2000 in the legacy LTE monitoring section within a configured ON duration.

When the IoT terminal 1000 according to an embodiment of the disclosure receives a status message from a vehicle terminal, the IoT terminal 1000 may determine the distance between the terminals and whether or not the terminal is close based on the location information of the corresponding vehicle terminal 2000 and its location information.

The IoT terminal 1000 according to an embodiment may increase the frequency of receiving status messages as the distance from the vehicle gets closer (i.e., as the degree of risk or emergency is increased).

According to an embodiment of the disclosure, the eDRX cycle may be reduced on the condition that the distance between the IoT terminal 1000 and the vehicle terminal 2000 is within a predetermined certain distance. In addition, the length of the ON duration may be increased on the condition that the distance between the IoT terminal 1000 and the vehicle terminal 2000 is within a predetermined certain distance.

A base station 3000 according to an embodiment may receive the eDRX cycle information and the length information of the ON duration requested by the IoT terminal 1000 and approve the configuration change for the eDRX period information and the length information of the ON duration.

In addition, when the IoT terminal 1000 according to an embodiment approaches the vehicle terminal 2000 within a maximum threshold value, the IoT terminal 1000 may request resources from the base station 3000 in advance to transmit a warning message to the vehicle terminal 2000 in the legacy LTE band.

Referring to FIG. 16, if the distance between the IoT terminal 1000 and the vehicle terminal 2000 is a distance of 30 m, which is a first threshold value, the IoT terminal 1000 may request the base station 3000 to change the first eDRX configuration, and if the distance between the IoT terminal 1000 and the vehicle terminal 2000 is a distance of 15 m, which is a second threshold value, the IoT terminal 1000 may perform a pre-resource request to the base station 3000 together with a second eDRX configuration change request. According to an embodiment, if the distance between the IoT terminal 1000 and the vehicle terminal 2000 is within a maximum threshold of 5 m, the IoT terminal 1000 may transmit a warning message to the vehicle terminal 2000 by utilizing the resources allocated from the base station 3000 according to the pre-resource request.

Figure 17:
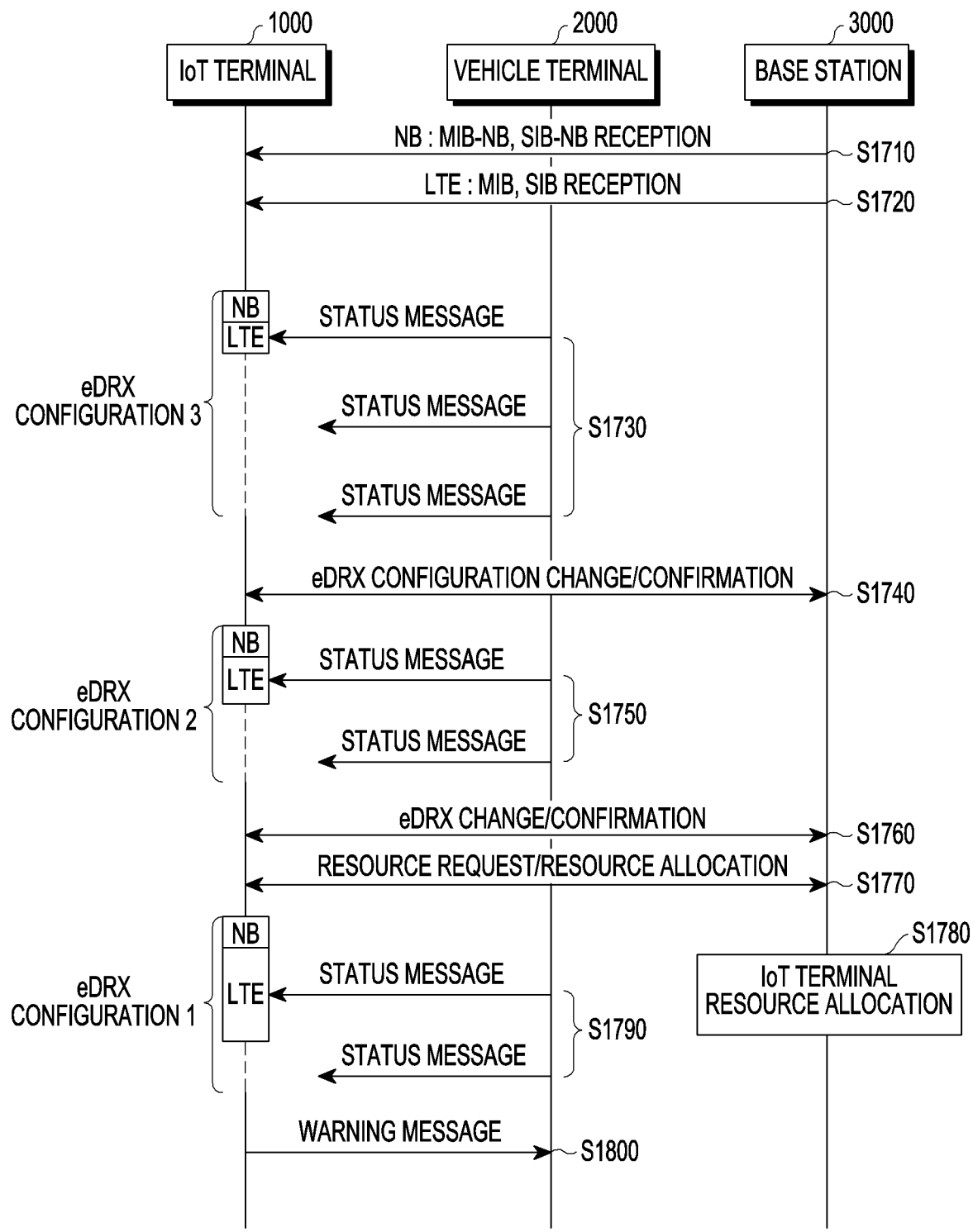
FIG. 17 is a flowchart illustrating a communication method between terminals via an LTE band according to an embodiment of the disclosure over time.

FIG. 17 is a flowchart illustrating a communication method between terminals via an LTE band according to an embodiment of the disclosure over time.

An IoT terminal 1000 according to an embodiment may receive a narrowband master information block (MIB-NB) and a narrowband system information block (SIB-NB) for an NB band from a base station 3000 (S1710), and may also receive a master information block (MIB) and a system information block (SIB) for an LTE band (S1720).

The IoT terminal 1000 may prepare to transmit and receive messages in both NB and LTE bands by acquiring system information of the legacy LTE and NB bands via the MIB-NB and SIB-NB received in S1710 and the MIB and SIB received in S1720.

A vehicle terminal 2000 according to an embodiment may periodically broadcast a status message including its location information in the LTE band.

When the vehicle terminal 2000 approaches the IoT terminal 1000, the IoT terminal 1000 may receive a status message of a vehicle by monitoring the LTE band.

The IoT terminal 1000 according to an embodiment of the disclosure may apply different eDRX configurations depending on the distance between the IoT terminal 1000 and the vehicle terminal 2000.

The IoT terminal 1000 may operate by applying an eDRX cycle and an ON duration corresponding to the eDRX configuration 3 and receive a status message of the vehicle terminal 2000 (S1730).

The IoT terminal 1000 according to an embodiment may calculate a distance between the IoT terminal 1000 and the vehicle terminal 2000 based on the received status message.

If it is confirmed that the vehicle terminal 2000 exists within a threshold distance of the eDRX configuration 2 as a result of the calculation, the IoT terminal 1000 may exchange the eDRX configuration change control message with the base station 3000 to increase the frequency of receiving the status message from the vehicle terminal 2000 immediately before the start of the next ON duration (S1740).

According to an embodiment, the IoT terminal 1000 may transmit an eDRX configuration change message to the base station 3000, and the base station 3000, having received the eDRX configuration change message, may transmit an eDRX configuration change confirmation message to the IoT terminal 1000, so that the eDRX configuration change control message exchange of S1740 may be performed.

The IoT terminal 1000 may react more sensitively to the state of the vehicle terminal 2000 as the distance from the vehicle terminal 2000 is reduced by performing the eDRX configuration change.

The newly configured eDRX configuration 2 due to the eDRX configuration change in S1740 may increase the length of the ON duration compared to the eDRX configuration 3, and the eDRX cycle may be reduced compared to the eDRX configuration 3.

In the eDRX configuration 3, the IoT terminal 1000 may receive one of three status messages transmitted from the vehicle terminal 2000 (S1730), but since one of the two state messages transmitted from the vehicle in the same period may be received after changing to the eDRX configuration 2 (S1750), the reception rate can be increased.

The IoT terminal 1000 may receive status messages from the vehicle terminal 2000 in the ON duration during operation in the eDRX configuration 2 (S1750).

If it is confirmed that the distance between the IoT terminal 1000 and the vehicle terminal 2000 is closer than the resource request threshold distance via the status messages received from the vehicle terminal 2000, the IoT terminal 1000 may request the base station 3000 to change the eDRX configuration again (S1760). In addition, if it is confirmed that the distance between the IoT terminal 1000 and the vehicle terminal 2000 is closer than the resource request threshold distance, the IoT terminal 1000 may request the base station 3000 for a resource for transmitting a warning message in the legacy LTE band (S1770).

The base station 3000 may allocate the resources of the legacy LTE band for transmitting a warning message of the IoT terminal 1000 according to the resource request of the IoT terminal 1000 in S1770 (S1780).

According to the eDRX configuration change of S1760, the IoT terminal 1000 may operate in the eDRX configuration 1 (S1790), and when it is confirmed that the distance between the IoT terminal 1000 and the vehicle terminal 2000 is within a warning message transmission threshold distance via the status message S1790 received from the vehicle terminal 2000 during the operation of the eDRX configuration 1, the IoT terminal 1000 may transmit a warning message to the vehicle terminal 2000, using the resources allocated in S1780 (S1800).

Hereinafter, a V2IoT communication method via an NB band will be described with reference to FIGS. 18 to 20.

Figure 18:
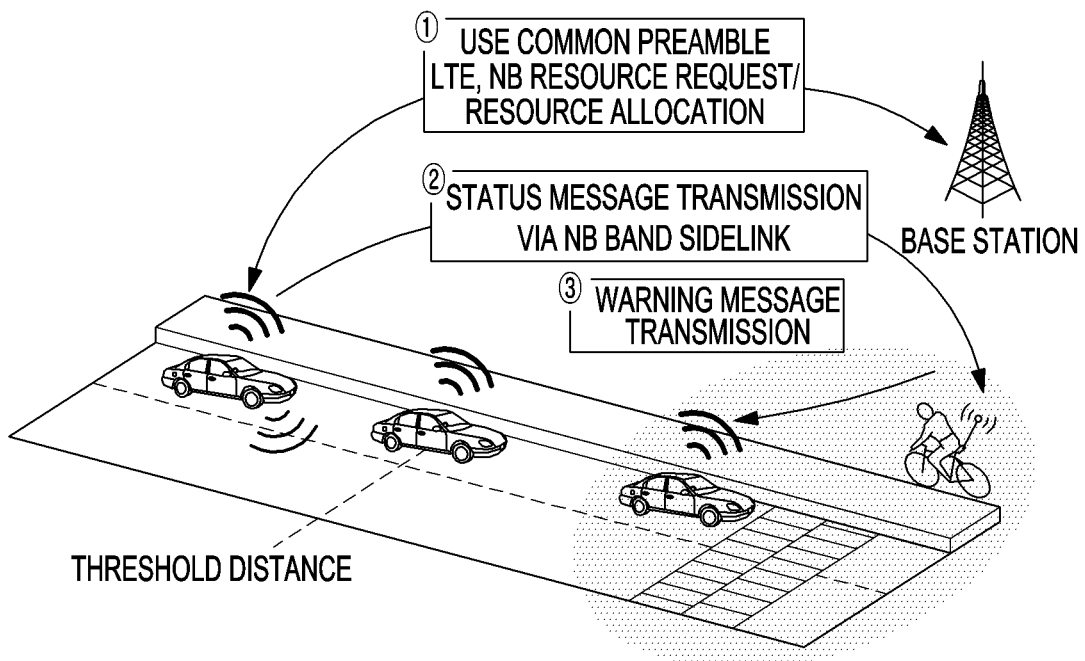
FIG. 18 is a diagram schematically illustrating a communication method between terminals via an NB band according to an embodiment of the disclosure.

FIG. 18 is a diagram schematically illustrating a communication method between terminals via an NB band according to an embodiment of the disclosure.

According to an embodiment of the disclosure, a vehicle terminal performs an NB band operation, thereby communicating with an IoT terminal. The vehicle terminal according to an embodiment may periodically transmit status messages in a legacy LTE and an NB band.

The IoT terminal configures an eDRX as described above with reference to FIGS. 15 to 17, thereby receiving a status message from the vehicle terminal and transmitting a warning message to the vehicle terminal.

In general, only uplink or downlink transmission is considered in the NB band in which an IoT terminal operates, and there is no sidelink for direct communication between terminals. Therefore, it is necessary to define a channel for a vehicle terminal to transmit a status message to an IoT terminal.

A vehicle terminal according to an embodiment of the disclosure may request independent resources for transmission in each of two bands to transmit status messages in a legacy LTE band and an NB band, respectively.

Figure 19:
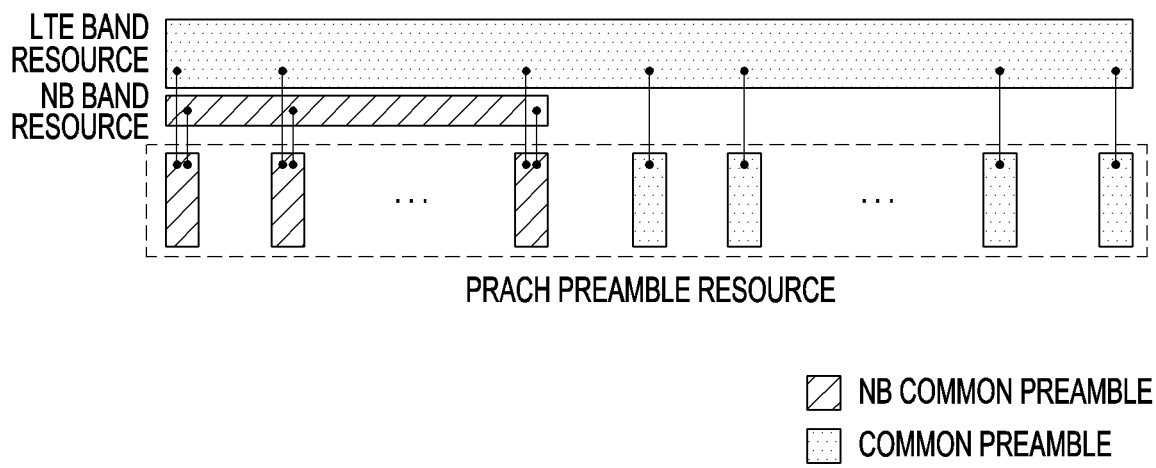
FIG. 19 is a diagram illustrating a method for allocating resources for each of an LTE band and an NB band according to an embodiment of the disclosure.

FIG. 19 is a diagram illustrating a method of allocating resources for each of an LTE band and an NB band according to an embodiment of the disclosure.

According to an embodiment of the disclosure, a vehicle terminal may request resources for each of the two bands for message transmission in each of the LTE and NB bands.

Referring to FIG. 19, a vehicle terminal may simultaneously request resources of the two bands via an NB common preamble corresponding to resources of the LTE band and the NB band.

When a base station receives the preamble from the vehicle terminal, the base station may allocate resources for each of the legacy LTE and NB bands to the vehicle terminal. Therefore, the vehicle terminal according to an embodiment of the disclosure may transmit status messages in two bands via one resource request.

Figure 20:
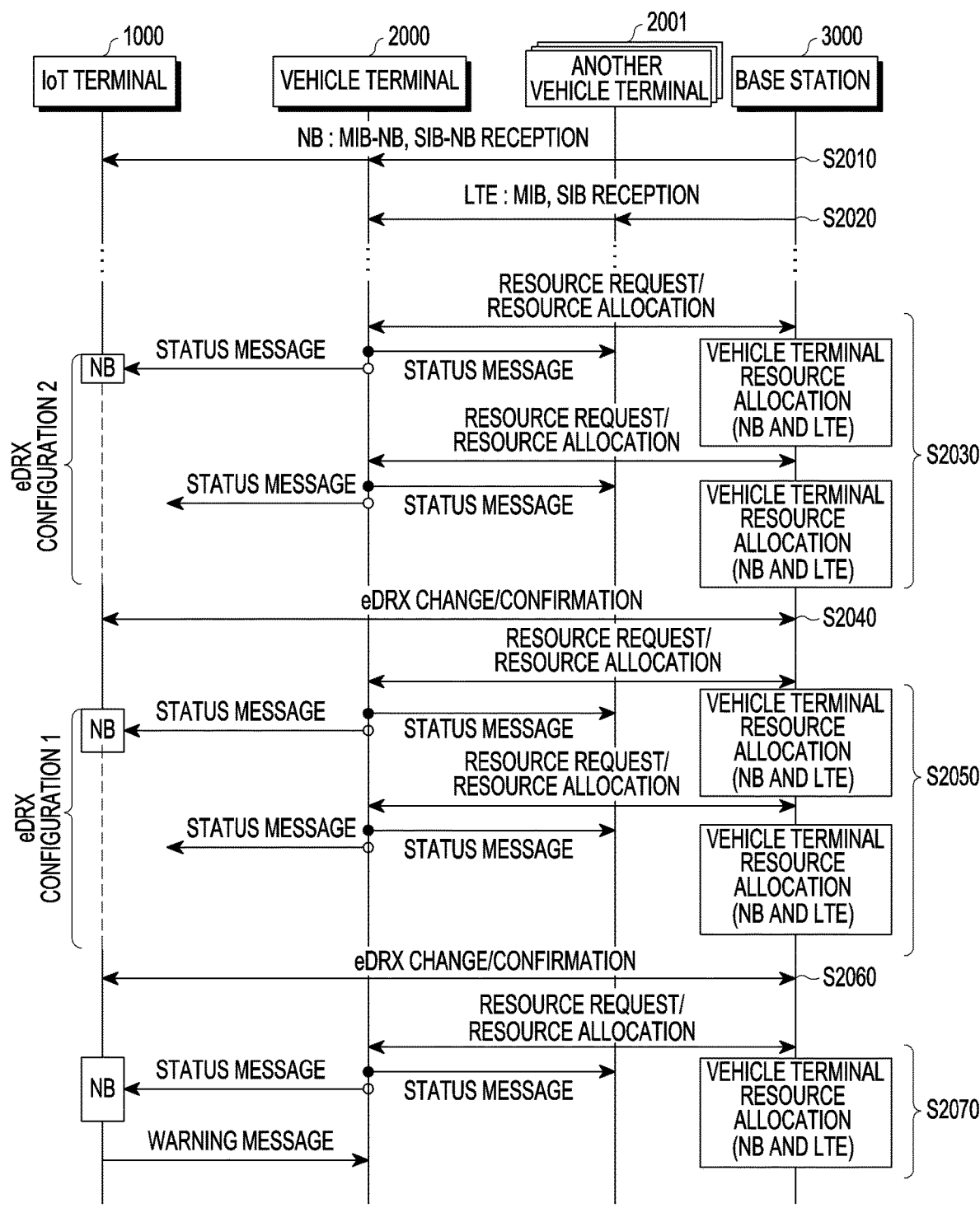
FIG. 20 is a flowchart illustrating a communication method between terminals via an NB band according to an embodiment of the disclosure over time.

FIG. 20 is a flowchart illustrating a communication method between terminals through an NB band according to an embodiment of the disclosure over time.

An IoT terminal 1000 and a vehicle terminal 2000 according to an embodiment may receive an MIB-NB and an SIB-NB for an NB band from a base station 3000 (S2010).

According to an embodiment of the disclosure, the base station 3000 may transmit information about a narrowband physical sidelink shared channel (NPSSCH) for communication between terminals in the NB band to the IoT terminal 1000 and the vehicle terminal 2000 via an SIB2-NB. The vehicle terminal 2000 may transmit a status message to the IoT terminal 1000 via the NPSSCH.

In addition, the vehicle terminal 2000 according to an embodiment may also receive the MIB and SIB for the LTE band (S2020).

The vehicle terminal 2000 according to an embodiment may request resources for the LTE band and the NB band from the base station 3000 by utilizing the NB common preamble, and may receive the allocated resources for each of the LTE and NB bands from the base station 3000 to transmit status messages to the IoT terminal 1000 and the vehicle terminal 2000 (S2030, S2050, and S2070). The vehicle terminal 2000 according to an embodiment of the disclosure may transmit a status message to another vehicle terminal 2001 via the LTE band, and may transmit a status message to the IoT terminal 1000 via the NB band.

The IoT terminal 1000 may change an eDRX configuration as the vehicle terminal 2000 approaches (S2040, S2060), and when the distance between the IoT terminal 1000 and the vehicle terminal 2000 is within a warning message transmission threshold distance, the IoT terminal 1000 may transmit a warning message to the vehicle terminal 2000 (S2080).

The eDRX configuration change process of S2040 and S2060 may be performed in the same manner as the eDRX configuration change process of FIG. 17, and a detailed description thereof will be omitted.

Hereinafter, application examples of V2IoT communication according to an embodiment of the disclosure will be described with reference to FIGS. 21 and 22.

Figure 21:
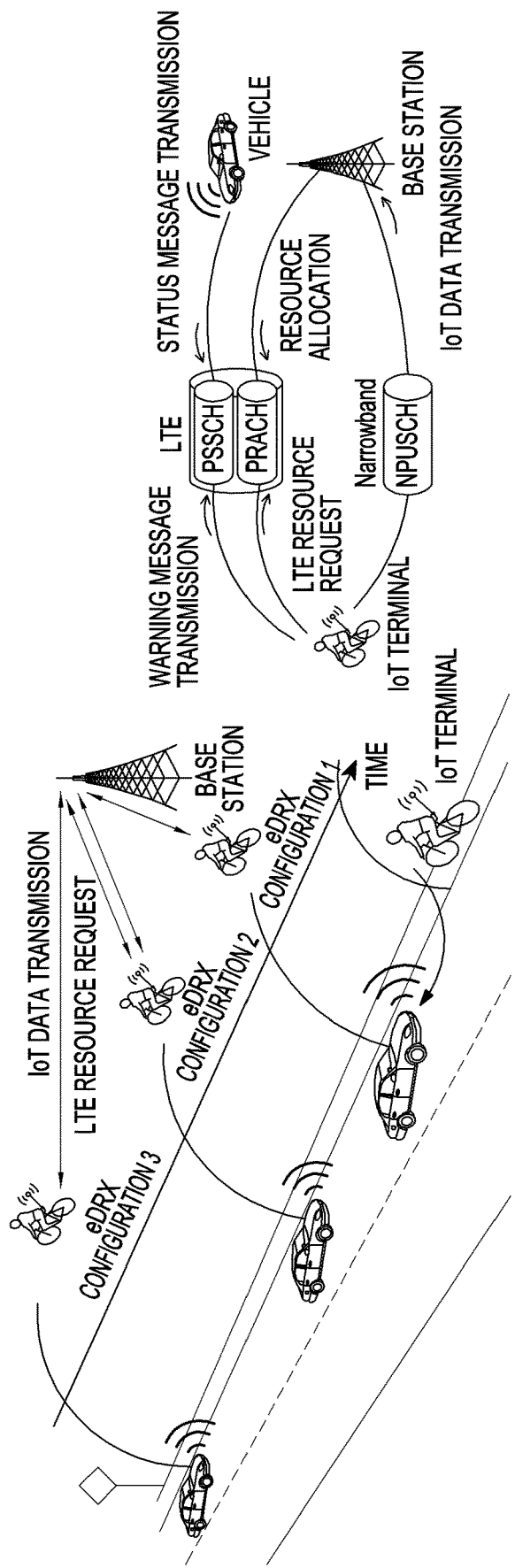
FIG. 21 is a diagram illustrating an example of applying a communication method between terminals via an LTE band according to an embodiment of the disclosure.

FIG. 21 is a diagram illustrating an example of applying a communication method between terminals via an LTE band according to an embodiment of the disclosure.

As a vehicle approaches an IoT terminal, the IoT terminal according to an embodiment may change an eDRX configuration.

Referring to FIG. 21, when the IoT terminal recognizes a vehicle that enters within a threshold distance of the eDRX configuration 2, the IoT terminal may change the eDRX configuration to the eDRX configuration 2. Subsequently, when the IoT terminal recognizes a vehicle within a resource request threshold distance, the IoT terminal may change the eDRX configuration to eDRX configuration 1 and request an LTE resource for transmitting a warning message. When the IoT terminal confirms the vehicle that entered within the warning message transmission threshold distance, the IoT terminal may transmit a warning message to the vehicle in the LTE band.

A vehicle according to an embodiment of the disclosure can prevent a traffic accident by receiving a warning message transmitted by the IoT terminal.

Figure 22:
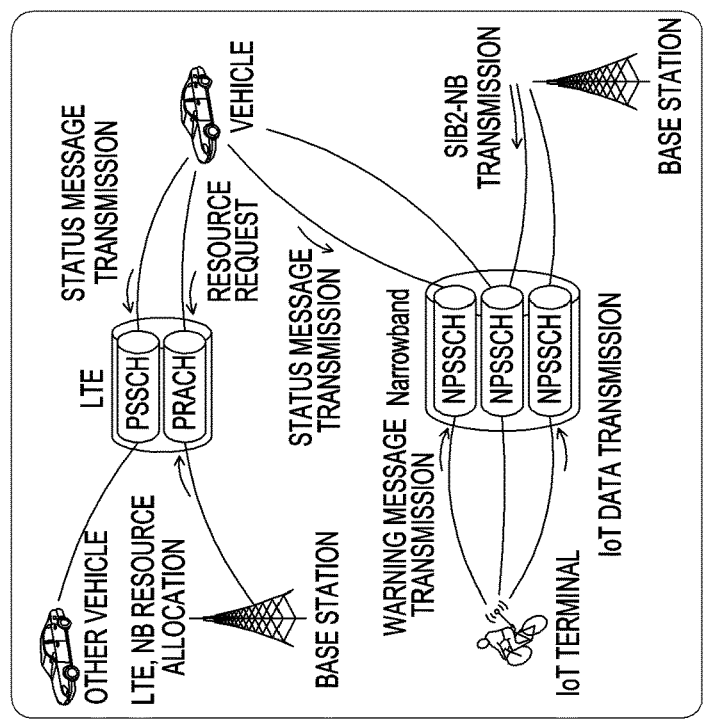
FIG. 22 is a diagram illustrating an example of applying a communication method between terminals via an NB band according to an embodiment of the disclosure.
Figure 22:
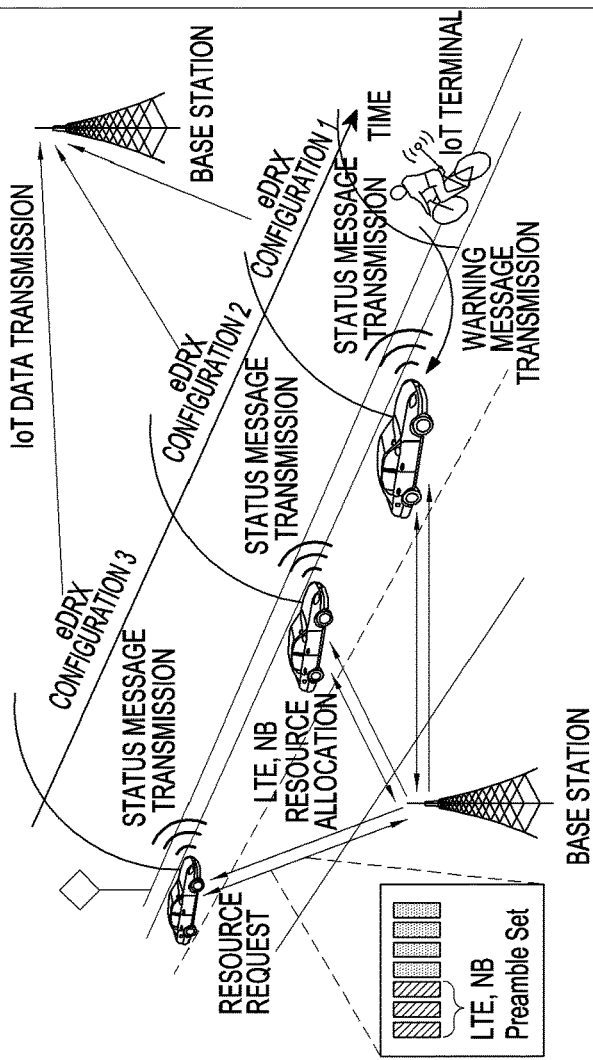

FIG. 22 is a diagram illustrating an example of applying a communication method between terminals via an NB band according to an embodiment of the disclosure.

A vehicle according to an embodiment may request resources for each of the LTE band and the NB band using an NB common preamble in a physical random-access channel (PRACH) of legacy LTE, and may receive allocated resources for each of the LTE band and the NB band from the base station.

The vehicle according to an embodiment may periodically transmit status messages to other vehicles and IoT terminals in the LTE band and the NB band via the allocated resources.

Referring to FIG. 22, a vehicle according to an embodiment may transmit a status message in the NB band via an NPSSCH.

The IoT terminal according to an embodiment may confirm a status message and change an eDRX configuration as the vehicle approaches. In addition, the IoT terminal may transmit a warning message to the vehicle via the NPSSCH when the IoT terminal detects that the vehicle is within a warning message transmission threshold distance.

Hereinafter, a method of changing an eDRX configuration will be described with reference to FIG. 23.

Figure 23:
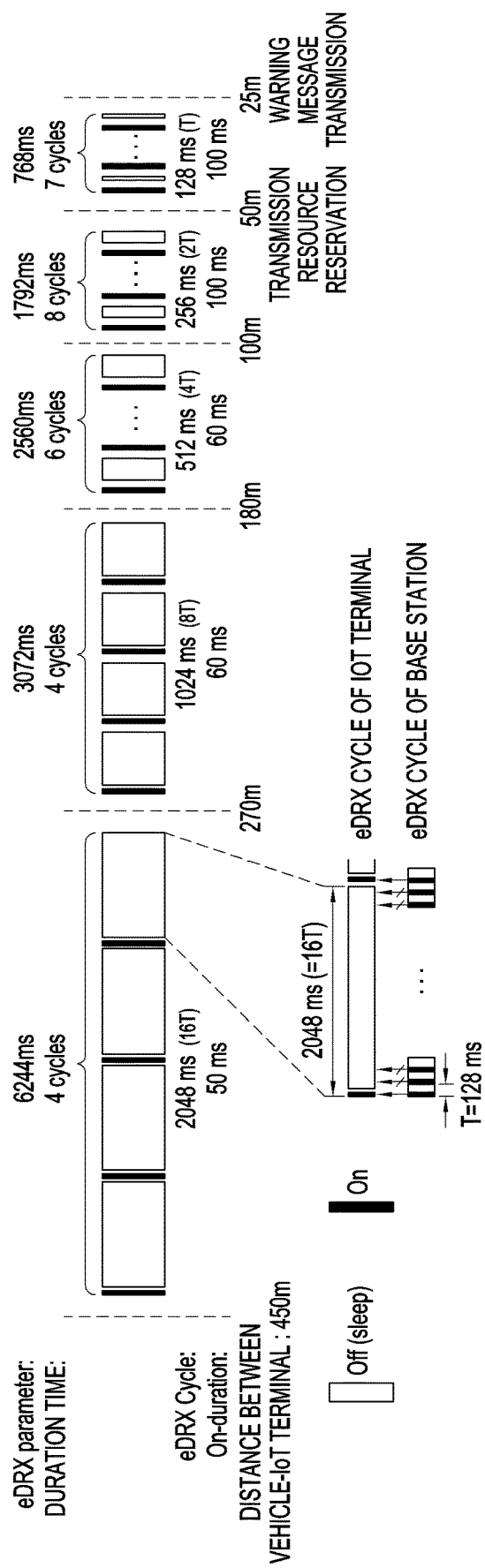
FIG. 23 is a diagram illustrating a method for changing an eDRX parameter according to an embodiment of the disclosure.

FIG. 23 is a diagram illustrating a method of changing an eDRX parameter according to an embodiment of the disclosure.

According to an embodiment, when eDRX parameters need to be changed, an IoT terminal may request a base station to change parameters and receive approval for the parameter change request from the base station.

According to an embodiment of the disclosure, the IoT terminal and the base station may configure a parameter set by pairing an eDRX cycle and an ON duration.

According to an embodiment of the disclosure, the eDRX cycle in the parameter set may be configured by 2n times (n=0, 1, . . . ) of the basic cycle T.

The IoT terminal according to an embodiment may omit a separate signaling procedure from the base station by changing the eDRX parameter itself within a predetermined parameter set when changing the eDRX parameters.

For example, referring to FIG. 23, when the IoT terminal detects that a distance between the IoT terminal and the vehicle is within a threshold distance, the next eDRX cycle may be configured to be half of the current eDRX cycle. On the other hand, when the IoT terminal detects that the distance between the IoT terminal and the vehicle is greater than the threshold distance, the next eDRX cycle may be increased to twice the current eDRX cycle.

According to an embodiment of the disclosure, the base station may operate with a basic cycle T of eDRX cycles constituting a parameter set. Since the eDRX cycle of the IoT terminal according to an embodiment is configured as an integer multiple of the basic cycle T, the ON duration of the base station operating in the basic cycle T may overlap the ON duration of the IoT terminal.

The eDRX parameter set according to an embodiment may be configured as shown in Table 1 below.

TABLE 1

| DRX cycle (ms) | ON duration (ms) |
| --- | --- |
| 2048 (= 16 T) | 50 |
| 1024 (= 8 T) | 60 |
| 512 (= 4 T) | 80 |
| 256 (= 2 T) | 100 |
| 128 (= T) | 100 |

Referring to <Table 1>, when the basic cycle T is 128 ms, the parameter set may be comprised of 1T=128 ms, 2T=256 ms, 4T=512 ms, 8T=1024 ms, and 16T=2048 ms, which are integer multiples of the basic cycle T.

Referring to FIG. 23 on the basis of <Table 1>, an IoT terminal according to an embodiment may operate with an eDRX cycle of the first 16T.

As described above, the base station according to an embodiment may operate at a cycle of T, corresponding to a basic cycle. Since the eDRX cycle of the IoT terminal is 16 times the basic cycle T, whenever the eDRX cycle of the base station (i.e., the basic cycle T) is repeated 16 times, the eDRX cycle of the IoT terminal overlaps the eDRX cycle (i.e., 16T) of the IoT terminal. Therefore, whenever the eDRX cycle (i.e., the basic cycle T) of the base station is repeated 16 times, the ON durations of the IoT terminal and the base station overlap each other, thereby enabling communication between the IoT terminal and the base station.

When the IoT terminal according to an embodiment detects that a vehicle is nearby, the IoT terminal may operate at 8T by reducing the next eDRX cycle to half of the current eDRX cycle (i.e., 16T). Thereafter, the IoT terminal may reduce the eDRX cycle to 4T, 2T, or T as the distance to the vehicle is reduced.

In addition, the IoT terminal according to an exemplary embodiment of the disclosure may increase the length of the ON duration to 80 ms or 100 ms as the vehicle approaches.

Therefore, the IoT terminal according to an embodiment of the disclosure may improve the reception rate of the status message of the vehicle.

Hereinafter, a case in which a vehicle communicates with a CIoT terminal according to an embodiment of the disclosure will be described with reference to FIGS. 24 and 25.

Figure 24:
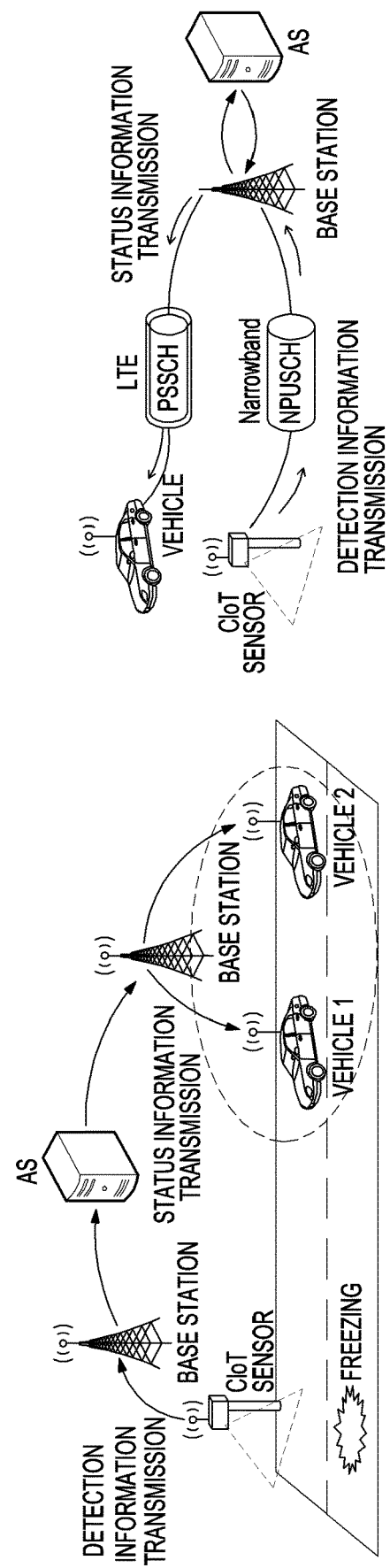
FIG. 24 illustrates a communication method between a vehicle and a CIoT terminal via an AS according to an embodiment of the disclosure.

FIG. 24 is a diagram illustrating a communication method between a vehicle and a CIoT terminal via an AS according to an embodiment of the disclosure.

According to an embodiment of the disclosure, V2IoT communication may be performed through a Cellular Internet-of-Things (CIoT) terminal equipped with a sensor function. The CIoT sensor terminal, which has a sensor function and a communication function, may be installed on a roadside to collect information (e.g., whether the road is frozen, the presence of a fallen rock, landslide occurrence, pot hole location, etc.) via a sensing operation and to transmit the collected information to an AS (application server).

The AS according to an embodiment may transfer the information received from the CIoT terminal to a vehicle.

According to an embodiment of the disclosure, the AS may be a server that provides a real-time danger notification service that detects and provides information about a dangerous situation of a road located ahead in the traveling direction to vehicles that have subscribed in advance. Vehicles intending to subscribe to the service may register with the AS as they receive a notification message including information on the service from the AS and apply for service subscription.

Referring to FIG. 23, the CIoT sensor terminal may detect the road and surroundings and transmit the detected information to the base station via an NB band. The CIoT sensor terminal may periodically or aperiodically perform the surrounding situation detection.

The base station may transfer the received information to the AS via a core network. The AS, having received the information from the base station, may analyze the detection results collected from the CIoT sensor terminals to determine the service subscription vehicle and area expected to be affected by the detection results.

An example of vehicles that are expected to be affected may be vehicles that must pass through an icy location on a driving route or vehicles located on the road leading to the icy location, in the case where the CIoT sensor terminal detects ice on the road.

The AS according to an embodiment may utilize broadcast-based V2X communication to transfer information to specific vehicles or to a specific region.

Figure 25:
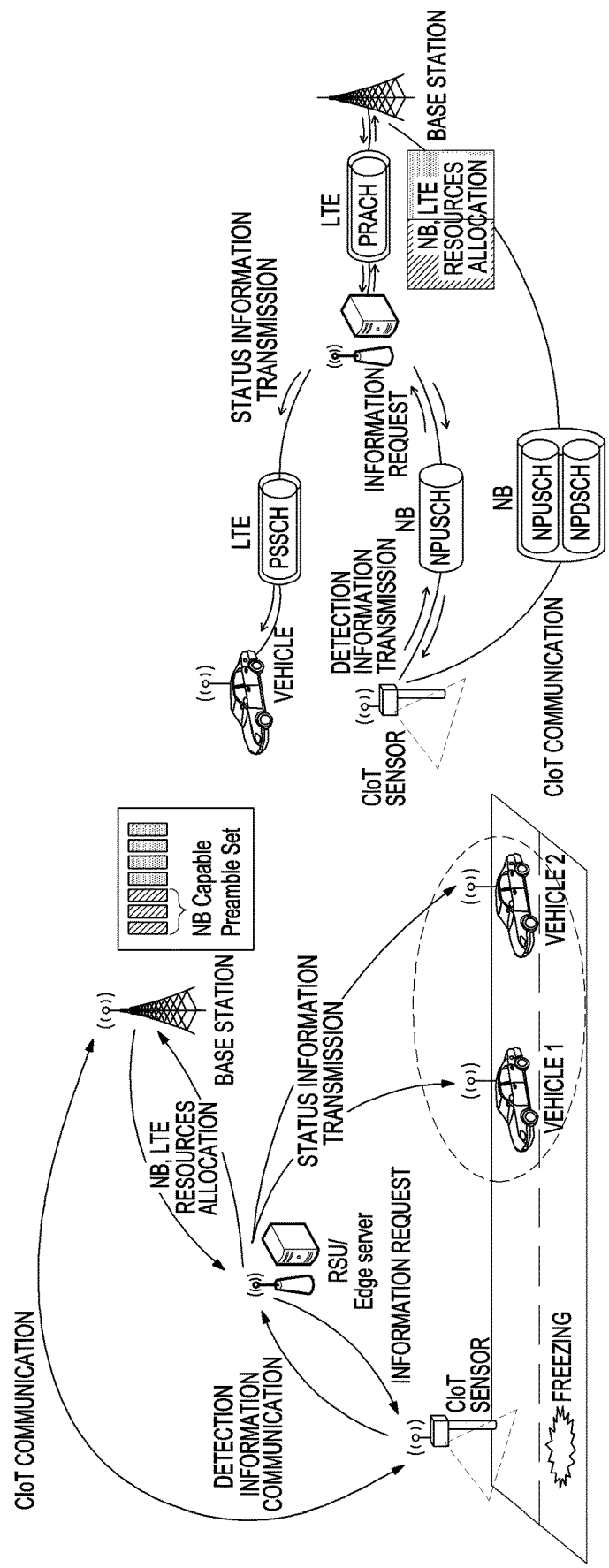
FIG. 25 is a diagram illustrating a communication method between a vehicle and a CIoT terminal via an RSU according to an embodiment of the disclosure.

FIG. 25 is a diagram illustrating a communication method between a vehicle and a CIoT terminal through an RSU according to an embodiment of the disclosure.

According to an embodiment of the disclosure, the result detected by the CIoT sensor terminal may be collected and analyzed by a roadside unit (RSU) adjacent to the CIoT sensor terminal and transmitted to a vehicle. The RSU may transmit the sensing information of the CIoT sensor terminal to the vehicle, using broadcast-based V2X communication.

The RSU according to an embodiment may determine a broadcast area by collecting and analyzing the detection result. The RSU can operate in both an NB band and an LTE band.

According to an embodiment, the RSU may acquire sidelink channel information of the NB band via an SIB2-NB broadcasted from the base station.

The RSU according to an embodiment of the disclosure may simultaneously acquire an NB band sidelink channel resource and an LTE band sidelink channel resource by utilizing an NB common preamble when performing random access.

According to an embodiment of the disclosure, the RSU may utilize the NB band sidelink channel to request sensing information from the CIoT sensor terminals or transmit an acknowledgment (ACK) for receiving data from the CIoT sensor terminals.

Thereafter, the RSU according to an embodiment may collect detection results from a nearby CIoT sensor terminal via an NB sidelink channel. The RSU may analyze the detection results collected from the CIoT sensor terminals to determine whether to transfer the analyzed information to the vehicles.

According to an embodiment of the disclosure, when it is determined that the analysis information needs to be transferred to the vehicles, the RSU may transfer the analysis information via broadcast-based V2X communication. According to an embodiment, the RSU may transfer the analysis information to the vehicles, using PC5-based broadcast in the LTE band.

Figure 26:
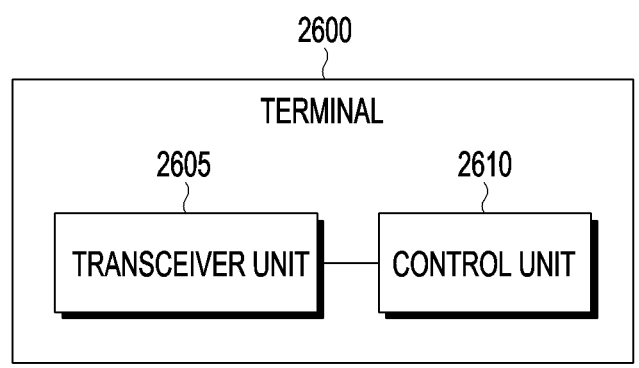
FIG. 26 is a diagram illustrating the configuration of a terminal according to an embodiment of the disclosure.

FIG. 26 is a diagram illustrating the configuration of a terminal 2600 according to an embodiment of the disclosure.

The terminal 2600 illustrated in FIG. 26 may include all terminals capable of communication, including a vehicle terminal, an IoT terminal, or a CIoT terminal.

The terminal 2600 may include a transceiver unit 2605 that performs signal transmission and reception with a base station or another terminal and a control unit 2610 that controls all operations of the terminal 2600. All techniques or methods performed in the terminal described above in the disclosure may be understood to be performed under the control of the control unit 2610. However, the control unit 2610 and the transceiver unit 2605 are not necessarily implemented as separate devices, but may be implemented as one component in the form of a single chip.

It should be noted that the method illustrations, system configurations, device configurations, and the like illustrated in FIGS. 1 to 26 are not intended to limit the scope of the disclosure. That is, all configurations or operations described in FIGS. 1 to 26 should not be construed as essential components for the practice of the disclosure, and may be implemented without departing from the spirit of the disclosure, even if only some of the components are included.

The above-described operations can be realized by providing a memory device storing the corresponding program code to any component in the base station or the terminal device of the communication system. That is, the controller of the base station or the terminal device can execute the above-described operations by reading and executing the program code stored in the memory device by the processor or the central processing unit (CPU).

The various components, modules, etc. of the base station or terminal device described herein may be implemented in hardware circuitry, such as complementary metal oxide semiconductor-based logic circuitry, firmware, software and/or hardware and firmware, and/or machine-readable media. It may also be operated using hardware circuitry such as a combination of embedded software. As an example, various electrical structures and methods may be implemented using transistors, logic gates, and electrical circuits such as application specific semiconductors.

Meanwhile, in the detailed description of the disclosure, specific embodiments have been described. However, various modifications may be possible without departing from the scope of the disclosure. Therefore, the scope of the disclosure should not be limited to the described embodiments, but should be determined not only by the scope of the following claims, but also by the equivalents of the claims.

The invention claimed is:

1. A method for a first terminal to support vehicle-to-everything (V2X) communication via data transmission, the method comprising:
    determining radio resources and a transmission order among the first terminal, a second terminal, and a third terminal for data transmission of V2X communication;
    transmitting, to the second terminal and the third terminal first data including information of the radio resources and information about the transmission order; and
    receiving, from at least one of the second terminal and the third terminal, second data using the radio resource based on the transmission order,
    wherein the first terminal, the second terminal, and the third terminal are configured to perform data transmission sequentially based on the transmission order.

2. The method of claim 1, further comprising:
    transmitting an interaction establishment request to the second terminal; and
    receiving an interaction establishment response from the second terminal,
    wherein the interaction establishment request includes information of a radio resource for transmitting the interaction establishment response of the second terminal, and the interaction establishment response includes information of a radio resource for transmitting the first data of the first terminal.

3. The method of claim 2, wherein the interaction establishment request includes initial configuration information including at least one of an interaction operation period, an interaction operation number, or an allowable transmission delay.

4. The method of claim 3, further comprising:
    when a last data transmission is completed based on the initial configuration information, transmitting an interaction termination confirmation message to the second terminal.

5. The method of claim 1, wherein the second data includes information of a radio resource for a third data transmission of the third terminal.

6. The method of claim 1, further comprising:
transmitting, to the third terminal, information of a radio resource for a third data transmission of the third terminal.

7. The method of claim 1, further comprising:
transmitting an interaction establishment request to the second terminal and the third terminal; and
receiving interaction establishment responses from each of the second terminal and the third terminal,
wherein the interaction establishment request includes information of a length of a transmission interval for the interaction establishment response, and
wherein the interaction establishment responses are received from each of the second terminal and the third terminal within the length of the transmission interval for the interaction establishment response.

8. The method of claim 7, wherein the interaction establishment request includes information of radio resources for transmitting the interaction establishment response of at least one of the second terminal and the third terminal.

9. The method of claim 1, further comprising:
transmitting interaction termination messages to the second terminal and the third terminal; and
receiving interaction termination confirmation messages from the second terminal and the third terminal.

10. A first terminal for supporting vehicle-to-everything (V2X) communication via data transmission, the first terminal comprising:
a transceiver unit; and
a control unit configured to:
determine radio resources and a transmission order among the first terminal, a second terminal, and a third terminal for data transmission of V2X communication, and
control the transceiver unit to transmit, to the second terminal and the third terminal, first data including information of the radio resources and information about the transmission order and receive, from at least one of the second terminal and the third terminal, second data using the radio resource based on the transmission order,
wherein the first terminal, the second terminal, and the third terminal are configured to perform data transmission sequentially based on the transmission order.

11. The first terminal of claim 10, wherein the control unit is further configured to control the transceiver unit to transmit an interaction establishment request to the second terminal and receive an interaction establishment response from the second terminal,
wherein the interaction establishment request includes information of a radio resource for transmitting the interaction establishment response of the second terminal, and the interaction establishment response includes information of a radio resource for transmitting the first data of the first terminal.

12. The first terminal of claim 11, wherein the interaction establishment request includes initial configuration information including at least one of an interaction operation period, an interaction operation number, or an allowable transmission delay.

13. The first terminal of claim 12, wherein the control unit is further configured to control the transceiver unit to transmit an interaction termination confirmation message to the second terminal when the last data transmission is completed based on the initial configuration information.

14. The first terminal of claim 10, wherein the second data includes information of a radio resource for a third data transmission of the third terminal.

15. The first terminal of claim 10, wherein the control unit is further configured to:
control the transceiver unit to transmit, to the third terminal, information of a radio resource for a third data transmission of the third terminal.

16. The first terminal of claim 10, wherein the control unit is further configured to:
control the transceiver unit to transmit an interaction establishment request to the second terminal and the third terminal, and
control the transceiver unit to receive interaction establishment responses from each of the second terminal and the third terminal, and
wherein the interaction establishment request includes information of a length an of a transmission interval for the interaction establishment response, and
wherein the interaction establishment responses are received from each of the second terminal and the third terminal within the length of the transmission interval for the interaction establishment response.

17. The first terminal of claim 16, wherein the interaction establishment request includes information of radio resources for transmitting the interaction establishment response of at least one of the second terminal and the third terminal.

18. The first terminal of claim 10, wherein the control unit is further configured to:
control the transceiver unit to transmit interaction termination messages to the second terminal and the third terminal, and
control the transceiver unit to receive interaction termination confirmation messages from the second terminal and the third terminal.

* * * * *